United States Patent
Wang et al.

(10) Patent No.: US 11,315,354 B2
(45) Date of Patent: Apr. 26, 2022

(54) METHOD AND APPARATUS THAT CONTROLS AUGMENTED REALITY (AR) APPARATUS BASED ON ACTION PREDICTION

(71) Applicant: SAMSUNG ELECTRONICS CO., LTD., Suwon-si (KR)

(72) Inventors: Hao Wang, Beijing (CN); Yang Liu, Beijing (CN); Hyong Euk Lee, Suwon-si (KR); Seungin Park, Yongin-si (KR); Qiang Wang, Beijing (CN); Yueying Kao, Beijing (CN); Weiming Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 16/718,404

(22) Filed: Dec. 18, 2019

(65) Prior Publication Data
US 2020/0202119 A1 Jun. 25, 2020

(30) Foreign Application Priority Data

Dec. 24, 2018 (CN) .......................... 201811585707.8
Oct. 29, 2019 (KR) ........................ 10-2019-0135393

(51) Int. Cl.
*G06V 40/10* (2022.01)
*G06N 3/04* (2006.01)
(Continued)

(52) U.S. Cl.
CPC .......... *G06V 40/103* (2022.01); *G06K 9/6292* (2013.01); *G06N 3/0454* (2013.01);
(Continued)

(58) Field of Classification Search
CPC .......... G06K 9/00369; G06K 9/00711; G06K 9/6292; G06K 9/3233; G06K 9/00342;
(Continued)

(56) References Cited

U.S. PATENT DOCUMENTS 9,727,132 B2   8/2017  Liu et al.
2011/0182469 A1  7/2011  Ji et al.
(Continued)

FOREIGN PATENT DOCUMENTS

CN   107220611 A    9/2017
CN   107451552 A   12/2017
(Continued)

OTHER PUBLICATIONS

Shi, Y., Tian, Y., Wang, Y. and Huang, T., 2017. Sequential deep trajectory descriptor for action recognition with three-stream CNN. IEEE Transactions on Multimedia, 19(7), pp. 1510-1520.*
(Continued)

*Primary Examiner* — Zhitong Chen
(74) *Attorney, Agent, or Firm* — NSIP Law

(57) ABSTRACT

A method and apparatus for controlling an augmented reality (AR) apparatus are provided. The method includes acquiring a video, detecting a human body from the acquired video, performing an action prediction with regard to the detected human body, and controlling the AR apparatus based on a result of the action prediction and a mapping relationship between human body actions and AR functions.

21 Claims, 17 Drawing Sheets

(51) Int. Cl.
*G06K 9/62* (2022.01)
*G06V 10/25* (2022.01)
*G06V 20/40* (2022.01)
*G06V 40/20* (2022.01)

(52) U.S. Cl.
CPC .............. *G06V 10/25* (2022.01); *G06V 20/40* (2022.01); *G06V 40/23* (2022.01)

(58) Field of Classification Search
CPC ........... G06K 9/00335; G06K 9/00671; G06N 3/0454; G06N 3/08
See application file for complete search history.

(56) References Cited

U.S. PATENT DOCUMENTS

2018/0129865 A1    5/2018   Zia et al.
2019/0387168 A1*  12/2019   Smith ................ G02B 27/0179

FOREIGN PATENT DOCUMENTS

CN          107506712 A    12/2017
CN          108377387 A     8/2018
KR     10-2013-0091596 A    8/2013

OTHER PUBLICATIONS

Wang, L., Ge, L., Li, R. and Fang, Y., 2017. Three-stream CNNs for action recognition. Pattern Recognition Letters, 92, pp. 33-40.*
Kong, Y. and Fu, Y., 2018. Human action recognition and prediction: A survey. arXiv preprint arXiv:1806.11230.*
Liu, Hong, Juanhui Tu, and Mengyuan Liu. "Two-Stream 3D Convolutional Neural Network for Human Skeleton-Based Action Recognition", *Journal of Latex Class Files*, vol. 14, No. 8, Aug. 2015 (pp. 1-5).
Yan, Yichao, et al., "Predicting Human Interaction via Relative Attention Model", *arXiv preprint arXiv:1705.09467*, May 26, 2017 (7 pages in English).
Girdhar, Rohit, et al., "A Better Baseline for AVA." *arXiv preprint arXiv:1807.10066*, Jul. 26, 2018 (5 pages in English).
Zhou, Qixian, et al. "Adaptive Temporal Encoding Network for Video Instance-level Human Parsing", *arXiv preprint arXiv:1808.00661*, Aug. 10, 2 018 (9 pages in English).
Gu, Chunhul, et al., "AVA: A Video Dataset of Spatio-temporally Localized Atomic Visual Actions", *Proceedings of the IEEE Conference on Computer Vision and Pattern Recognition*. 2018 (pp. 6047-6056).
Moon, Gyeongsik et al., V2V-PoseNet: Voxel-to-Voxel Prediction Network for Accurate 3D Hand and Human Pose Estimation from a Single Depth Map, *2018 IEEE/CVF Conference on Computer Vision and Pattern Recognition*, 2018 (pp. 5079-5088).

* cited by examiner

| Action | AR function |
|---|---|
| Singing | f11, f12, f13, ... |
| Smoking | f21, f22, f23, ... |
| Handshaking | f31, f32, f33, ... |
| Instrument playing | f41, f42, f43, ... |
| ..... | ..... |

FIG. 3

METHOD AND APPARATUS THAT CONTROLS AUGMENTED REALITY (AR) APPARATUS BASED ON ACTION PREDICTION

CROSS-REFERENCE TO RELATED APPLICATIONS

This application claims the benefit under 35 USC 119(a) of Chinese Patent Application No. 201811585707.8, filed on Dec. 24, 2018, in the State Intellectual Property Office of China, and Korean Patent Application No. 10-2019-0135393, filed on Oct. 29, 2019, in the Korean Intellectual Property Office, the entire disclosures of which are incorporated herein by reference for all purposes.

BACKGROUND

1. Field

The following description relates to a sequence processing method and apparatus.

2. Description of Related Art

In daily life, people can perform a variety of different types of actions or activities. Different pieces of information and different corresponding augmented reality (AR) functions may be used for each type of action or activity. When AR functions that perform the above different actions or activities need to be manually installed and executed, a substantial amount of time and energy may be consumed by a user, which may seriously affect a user's experience and interfere with a user's normal daily habits.

Various methods for predicting (or identifying) actions of a user have been proposed. For example, recently, an action prediction method that is based on two streams including a color image sequence and an optical flow image sequence, and based on a region of interest (ROI) pooling has been provided. In the action prediction method, a three-dimensional (3D) convolutional neural network (CNN) feature of a color image sequence, a ROI for an action of a key frame and a 3D CNN feature of an optical flow image sequence are extracted from a video input, a pooling of the 3D CNN feature of the color image sequence and the 3D CNN feature of the optical flow image sequence is performed based on the ROI, and a feature fusion for features after the pooling is performed, to predict an action of a user.

However, the action prediction method based on the two streams and the ROI pooling have disadvantages. When only a color image and optical flow information are used, it may be difficult to distinguish similar actions due to a lack of a human body part model. When only a ROI containing a user is used, a human interaction and context around an image used to determine the human interaction may be insufficient. Additionally, since a great amount of time may be used to calculate an optical flow, the action prediction method may not be suitable for a real-time AR interactive scenario.

Also, currently, a user may typically have to consciously control an AR device with a user interface. For example, a user may select, turn on, or turn off a predetermined AR function by utilizing a scheme, such as a touch, sound, a pose or a gaze. When an AR function required by a user is provided without a separate operation of the user, the user may more conveniently use an AR environment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a method of controlling an augmented reality (AR) apparatus includes acquiring a video, detecting a human body from the acquired video, performing an action prediction with regard to the detected human body; and controlling the AR apparatus based on a result of the action prediction and a mapping relationship between human body actions and AR functions.

The acquired video may be one or more of a video of the AR apparatus and a user of the AR apparatus captured by a camera distinguished from the AR apparatus, a video captured from a viewpoint of the user of the AR apparatus with a camera connected to the AR apparatus, and a video generated and stored in advance in the AR apparatus.

In response to the acquired video being a video of the AR apparatus and a user of the AR apparatus captured by a camera distinguished from the AR apparatus, the detecting of the human body may include recognizing the user corresponding to the detected human body, associating the user with the AR apparatus based on an AR user database (DB); and establishing a communication with the AR apparatus.

The performing of the action prediction may include performing the action prediction by fusing classification results based on a plurality of action classification schemes.

The performing of the action prediction may include acquiring a frame-based local feature image, a video-based local feature image and a video-based global feature image from an image frame of the acquired video, acquiring action classification results by performing an action classification with regard to the human body actions based on any two or any combination of a first action classification scheme of using the frame-based local feature image and a human body pose feature, a second action classification scheme of using the video-based local feature image, and a third action classification scheme of using the video-based global feature image and the video-based local feature image; and fusing the action classification results and performing the action prediction.

The acquiring of the action classification results may include determining an image area of a human body instance in the image frame of the acquired video, performing an approximate partial semantic segmentation on a human body image area candidate extracted from the image area, and generating an approximate semantic segmentation result corresponding to detailed parts of the human body, predicting a relative direction of each pixel in the image frame with respect to a central portion of the human body and generating a direction prediction result, performing a convolution based on the approximate semantic segmentation result and the direction prediction result and generating a human body part parsing result; and performing the action classification with the first action classification scheme based on the frame-based local feature image, the human body pose feature and the human body part parsing result.

The acquiring of the frame-based local feature image, the video-based local feature image and the video-based global feature image from the image frame of the video may include generating a frame-based global feature image by extracting a feature from an image sequence of a temporal-spatial domain of the image frame using a three-dimensional (3D) convolutional neural network (CNN), determining a region of interest (ROI) candidate from the frame-based global feature image using a regional recommendation network (RPN), performing a ROI pooling with the ROI candidate with respect to the image frame and tearing the frame-based local feature image from the frame-based global feature image, generating the video-based local feature image by performing a ROI sorting on the frame-based local feature image; and generating the video-based global feature image based on the frame-based global feature image and the video-based local feature image.

The acquiring of the frame-based local feature image, the video-based local feature image and the video-based global feature image from the image frame of the video may include performing an action localization on a plurality of frame-based local feature images including the frame-based local feature image and selecting the video-based local feature image from a plurality of video-based local feature images.

The performing of the action localization may include performing the action localization with a fully connected (FC) network that comprises a first FC branch that determines which ROI candidate includes the human body and a second FC branch that determines a position of a box including the human body.

The performing of the action prediction may include acquiring a video-based local feature image from an image frame of the video, extracting a first feature associated with a human body pose action and a second feature associated with an interactive action from the video-based local feature image with a first 3D CNN having a human body pose action as a classification label and a second 3D CNN having an interactive action as a classification label; and fusing the first feature and the second feature and acquiring an action classification result.

The first 3D CNN may be trained in advance with a loss function that classifies pose actions with a plurality of labels in mutually exclusive categories, and the second 3D CNN may be trained in advance with a loss function that classifies interactive actions with a plurality of labels in mutually non-exclusive categories.

A server that controls an augmented reality (AR) apparatus includes a processor and a memory comprising instructions executable in the processor, wherein in response to the instructions being executed in the processor, the processor is configured to: acquire a video, detect a human body from the acquired video, perform an action prediction with regard to the detected human body; and control the AR apparatus based on a result of the action prediction and a mapping relationship between human body actions and AR functions.

The acquired video may be a video of the AR apparatus and a user of the AR apparatus captured by a camera distinguished from the AR apparatus.

The processor may be configured to recognize a user corresponding to the detected human body, to associate the user with the AR apparatus, and to establish a communication with the AR apparatus.

The processor may be configured to perform the action prediction by fusing classification results based on a plurality of action classification schemes.

The processor may be configured to acquire a video-based local feature image from an image frame of the acquired video, extract a first feature associated with a human body pose action and a second feature associated with an interactive action from the video-based local feature image with a first three-dimensional (3D) convolutional neural network (CNN) having a human body pose action as a classification label and a second 3D CNN having an interactive action as a classification label; and fuse the first feature and the second feature and acquire an action classification result.

An augmented reality (AR) apparatus includes a processor; and a memory comprising instructions executable in the processor, wherein in response to the instructions being executed in the processor, the processor is configured to: acquire a video detect a human body from the acquired video; perform an action prediction with regard to the detected human body; and execute an AR function based on a result of the action prediction and a mapping relationship between human body actions and AR functions. The acquired video may be a video captured from a viewpoint of a user of the AR apparatus with a camera connected to the AR apparatus, or a video generated and stored in advance in the AR apparatus.

The processor may be configured to perform the action prediction by fusing classification results based on a plurality of action classification schemes.

The processor may be configured to acquire a video-based local feature image from an image frame of the video, extract a first feature associated with a human body pose action and a second feature associated with an interactive action from the video-based local feature image with a first three-dimensional (3D) convolutional neural network (CNN) having a human body pose action as a classification label and a second 3D CNN having an interactive action as a classification label; and fuse the first feature and the second feature and acquire an action classification result.

In a general aspect, a method includes acquiring a video with an augmented reality (AR) apparatus, detecting an object in the acquired video, performing an action prediction with regard to the detected object; and displaying, on the AR apparatus, an AR function based on a result of the action prediction. Other features and aspects will be apparent from the following detailed description, the drawings, and the claims.

BRIEF DESCRIPTION OF DRAWINGS

FIG. 3 illustrates an example of a mapping relationship between a human body action and an AR function, in accordance with one or more embodiments.

Figure 1:
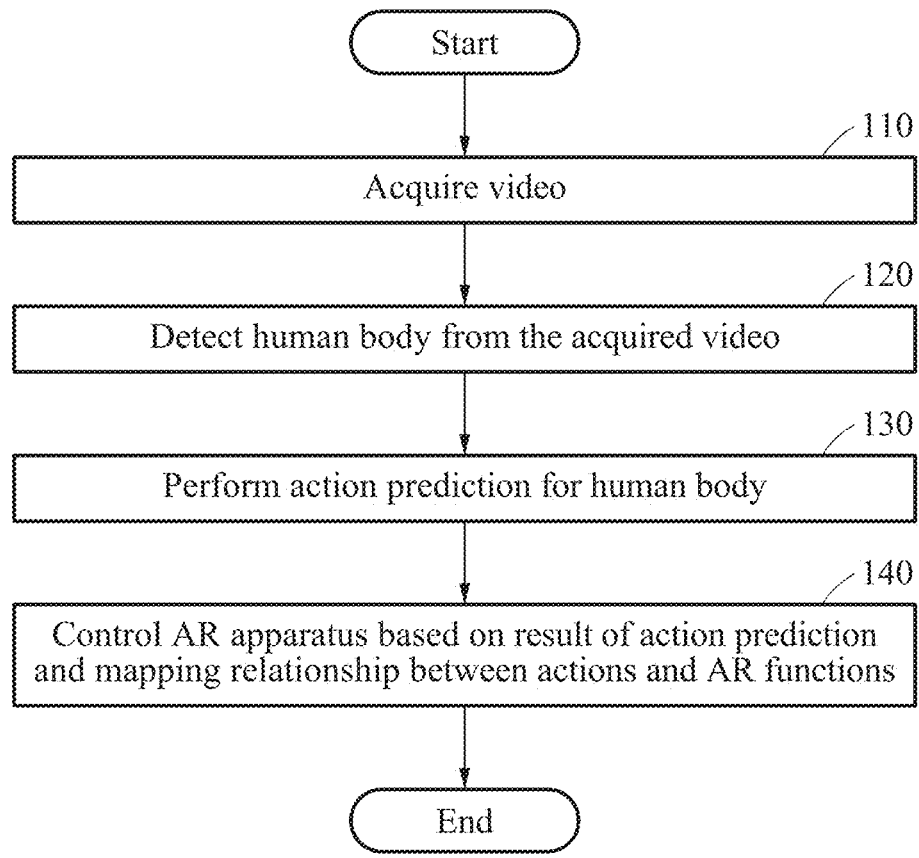
FIG. 1 is a flowchart illustrating an example of a method of controlling an augmented reality (AR) apparatus based on an action prediction, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, examples will be described in detail with reference to the accompanying drawings, and like reference numerals in the drawings refer to like elements throughout.

FIG. 1 is a flowchart illustrating an example of a method of controlling an augmented reality (AR) apparatus based on an action prediction, in accordance with one or more embodiments. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer that perform the specified functions, or combinations of special purpose hardware and computer instructions. The method of FIG. 1 may be performed in a server or the AR apparatus based on an AR system environment.

Referring to FIG. 1, in operation 110, a video is acquired. The video includes a plurality of image frames. The video may be, for example, a video (hereinafter, referred to as a "third-person video") acquired by capturing an AR apparatus and a user of the AR apparatus with a camera that is distinguished from the AR apparatus, a video (hereinafter, referred to as a "first-person video") captured from a viewpoint of the user of the AR apparatus with a camera connected to the AR apparatus, or a video (hereinafter, referred to as a "prestored video") generated and stored in advance in the AR apparatus. The third-person video and the first-person video may be captured in real time.

In operation 120, a human body may be detected from the acquired video. In operation 130, an action prediction for the detected human body is performed. An action of a human body is briefly referred to as a "human body action" or an "action". A human body may correspond to a user (hereinafter, referred to as an "apparatus user") of an AR apparatus, or a user (hereinafter, referred to as "another user") other than the user of the AR apparatus. For example, a human body in the first-person video may correspond to an apparatus user, and a human body in the third-person video and the prestored video may correspond to a user other than the apparatus user.

An action of a human body includes, for example, a human body pose action, and an interactive action. For example, the human body pose action may include mutually exclusive actions (for example, sitting or standing), and the interactive action may include mutually non-exclusive actions (for example, smoking or reading). The human body pose action and the interactive action will be further described below.

An action prediction may be performed by various examples.

In an example, an action prediction may be performed by fusing classification results based on a plurality of action classification schemes. The plurality of action classification schemes may include, for example, a first action classification scheme of using a frame-based local feature image and a human body pose feature, a second action classification scheme of using a video-based local feature image, and a third action classification scheme of using a video-based global feature image and a video-based local feature image. The action prediction may be performed by fusing classification results based on any two or any combination of the first through third classification schemes. By performing a human body part analysis and a global-local feature fusion, subtle differences between actions may be effectively distinguished. The example will be further described below.

In another example, an action prediction is performed by fusing a feature associated with a human body pose action and a feature associated with an interactive action. For example, a first feature associated with a human body pose action and a second feature associated with an interactive action may be extracted from a video-based local feature image using a first three-dimensional (3D) convolutional neural network (CNN) having a human body pose action as a classification label and a second 3D CNN having an interactive action as a classification label, and an action classification result may be acquired by fusing the first feature and the second feature. Based on the action classification result, the action prediction may be performed. Thus, an action including an interaction between a human and an object and an interaction between humans may be effectively predicted. The example will be further described below.

In operation 140, the AR apparatus is controlled based on a result of the action prediction and a mapping relationship between human actions and AR functions. Depending on examples, a mapping relationship between actions and AR functions may be defined in advance. For example, an AR function required by an apparatus user may be mapped to each action of a human body. The mapping relationship between the actions and the AR functions may be stored in a mapping database (DB), and a server and the AR apparatus may verify an AR function corresponding to a predicted action by accessing the mapping DB as necessary. For example, the AR function may include an AR display function.

When the AR function corresponding to the predicted action is verified, the server may control the AR apparatus to execute the AR function. The AR apparatus may execute the AR function. For example, when a user is predicted to be smoking based on a third-person video, smoking-related information (for example, smoking area guidance) may be provided by an AR function.

Figure 2:
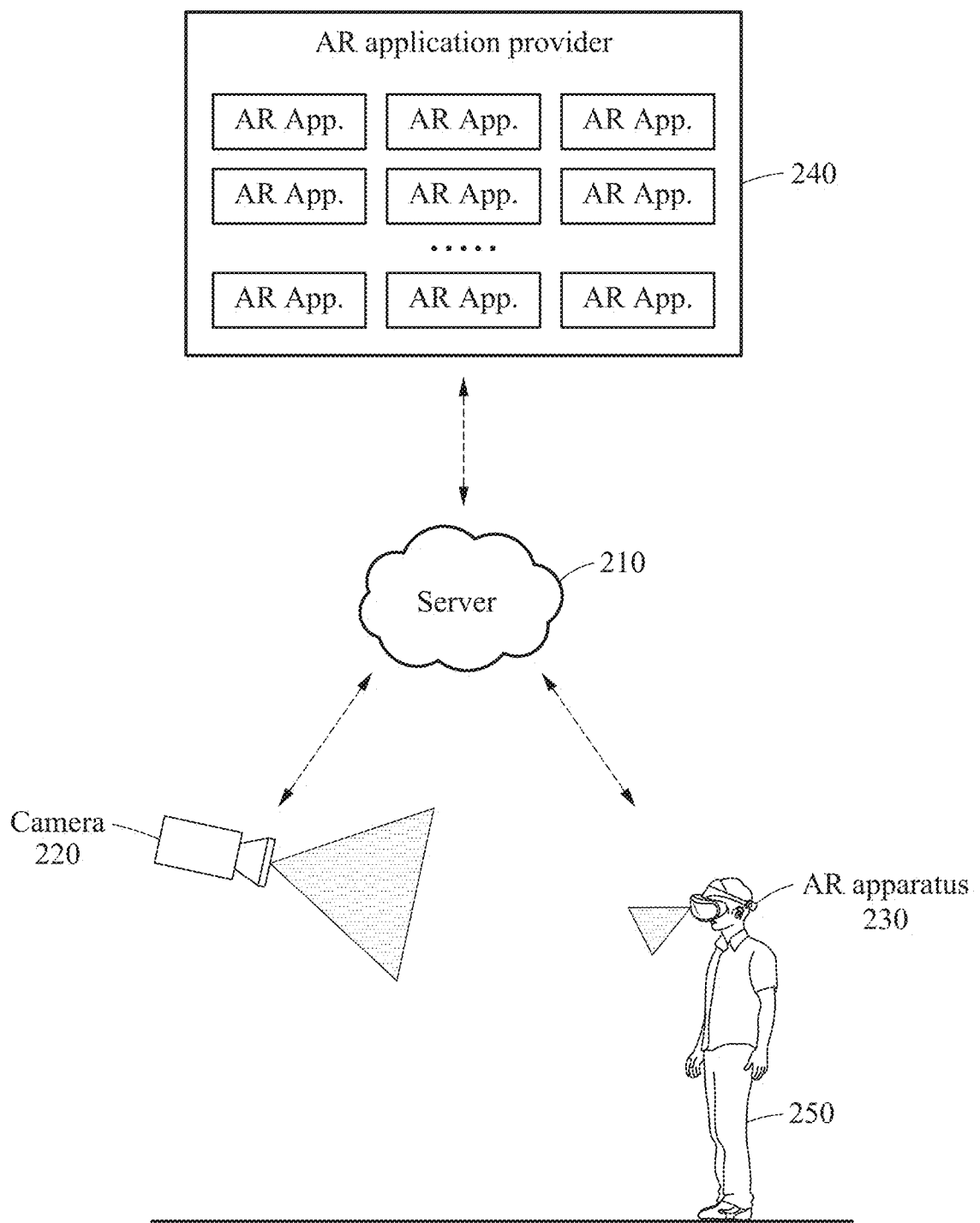
FIG. 2 illustrates an example of an AR system environment, in accordance with one or more embodiments.

FIG. 2 illustrates an example of an AR system environment in accordance with one or more embodiments. Referring to FIG. 2, a camera 220 captures a video and provides the captured video to a server 210. In an example, the camera 220 may have its own communication system, and may be able to implement its own communication functions. In another example, to the camera may be connected to another apparatus that performs communication between the camera and other external apparatuses. The video captured by the camera 220 may include an AR apparatus 230 and an apparatus user 250 of the AR apparatus 230. In this example, the video captured by the camera 220 corresponds to a third-person video. The camera 220 may be, for example, a camera installed in a residential environment of the apparatus user 250 in an Internet of Things (IoT) network system, or a surveillance camera that is installed in public environments such as offices and stores. Additionally, a target action to be predicted in the third-person video may correspond to an action performed by the apparatus user 250.

The server 210 may recognize the apparatus user 250 from the video, and associate the apparatus user 250 with the AR apparatus 230 based on an AR user DB. The AR user DB stores information of each AR apparatus 230, information of each apparatus user 250, and mapping information of each AR apparatus 230 and each apparatus user 250. For example, when a plurality of AR apparatuses 230 are registered for the same apparatus user 250, the server 210 may specify the AR apparatus 230 among the plurality of AR apparatuses 230 based on additional information, for example, a shape or other distinguishing feature of the AR apparatus 230 in the video.

The server 210 may establish a communication with the AR apparatus 230. For example, the server 210 may establish the communication with the AR apparatus 230 using the apparatus user 250 as a medium. The server 210 may predict an action of the apparatus user 250 and control the AR apparatus 230 to execute an AR function corresponding to the predicted action.

When the AR apparatus 230 is unable to execute the AR function corresponding to the predicted action, the server 210 may access an AR application provider 240 to assist the AR apparatus 230 so that the AR apparatus 230 may execute the AR function. For example, when a required AR function is not stored in the AR apparatus 230, the server 210 may control the AR apparatus 230 so that the AR apparatus 230 may download the required AR function from the AR application provider 240. The AR application provider 240 may store various AR applications. For example, the AR application provider 240 may store AR applications for AR functions stored in the mapping DB.

FIG. 3 illustrates an example of a mapping relationship between a human body action and an AR function. FIG. 3 illustrates actions, and AR functions mapped to the actions. The actions may include, for example, but not limited to, singing, smoking, handshaking or instrument playing. In FIG. 3, AR functions f11, f12 and f13 are mapped to singing, and AR functions f21, f22 and f23 are mapped to smoking. Additionally, AR functions f31, f32 and f33 are mapped to handshaking, and AR functions f41, f42 and f43 are mapped to instrument playing.

For example, the AR functions f11, f12 and f13 associated with a singing action may include any one or any combination of a function of predicting a song and retrieving the song from a song DB of the Internet or a local memory, a function of displaying the lyrics of a song, a function of displaying a title and/or a name of the singer of a song, and a function of synchronously playing back an accompaniment of a song in an apparatus.

In an example, the AR functions f21, f22 and f23 associated with the smoking action may include at least one of a function of displaying whether a user is currently located in a smoking area and a function of displaying information (for example, a map or navigation) associated with a smoking area (for example, a nearest smoking area) when the user is not currently located in the smoking area.

In an example, the AR functions f31, f32 and f33 associated with the handshaking action may include at least one of a function of recognizing another party or individual with whom the user shakes hands, and a function of displaying information about the other individual around the other individual. The AR functions f41, f42 and f43 associated with the instrument playing action may include any one or any combination of a function of predicting a musical instrument, a function of displaying the name of a musical instrument, and a function of displaying a musical note next to a musical instrument.

In an example, when a plurality of AR functions matches a predicted action, an apparatus user may store, in a server in advance, setting information associated with the above matching relationship. The server may select at least one AR function from the plurality of AR functions based on the setting information, and may transmit a control command for the selected AR function to an AR apparatus. The setting information may include, for example, at least one of an AR function preferred by the apparatus user when the plurality of AR functions are similar to a single human body action, and a screen layout of displayed information.

In another example, information associated with the matching relationship may be stored in a memory of the AR apparatus. In this example, the server may transmit a plurality of AR functions matching a predicted action to the AR apparatus, and the AR apparatus may select at least one AR function from the plurality of AR functions based on setting information and execute the selected AR function.

The server may update a state of a current human body action based on an action prediction result, and may transmit a command to terminate an AR function that does not match the current human body action to the AR apparatus based on a mapping relationship between an action and an AR function. For example, when a user sits and then walks, a state of a human body action may be updated from a sitting state to a walking state, and an AR function corresponding to sitting may be terminated.

Figure 4A:
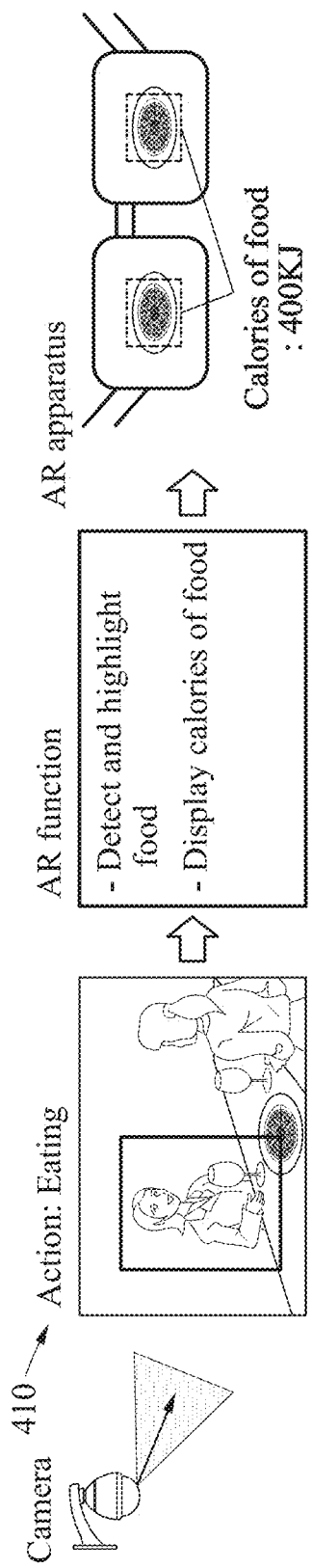
FIGS. 4A-4C illustrate examples of application scenes of a third-person video, in accordance with one or more embodiments.
Figure 4B:
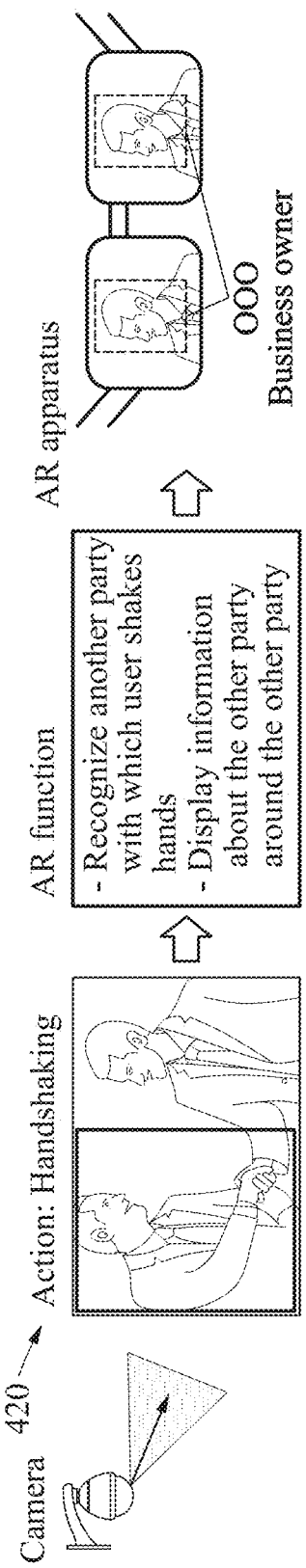
Figure 4C:
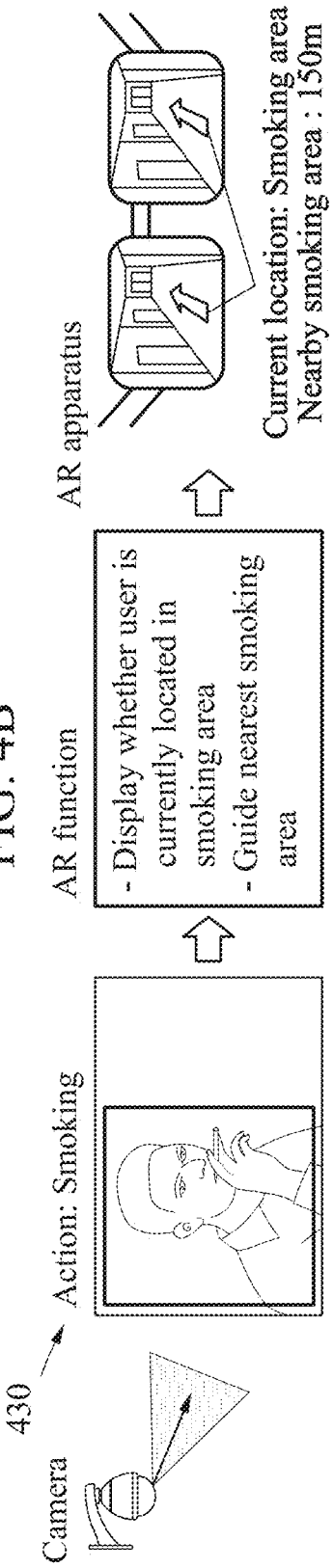

FIGS. 4A-4C illustrate examples of application scenes of a third-person video. Referring to FIGS. 4A-4C, in each of scene 410 (FIG. 4A), scene 420 (FIG. 4B) and scene 430 (FIG. 4C), an AR apparatus and an apparatus user are captured using a camera. A server may recognize the apparatus user and establish a communication connection with the AR apparatus. When a video is received from the camera, the server may predict an action of the apparatus user captured in the video.

Referring to FIG. 4A, in the scene 410, an action of an apparatus user is predicted to correspond to "eating". In this example, AR functions mapped to eating may include, as examples, a function of detecting and highlighting food, and a function of displaying calories of food. The AR apparatus executes the above AR functions based on a control of the server. For example, in FIG. 4A, food is detected and highlighted in the AR apparatus, and calories of the detected food may be displayed as "400 KJ". In the example of FIG. 4A, the AR apparatus is assumed as smart glasses. However, this is only an example, and the AR apparatus may be, for example, a smartphone or a smart watch.

Referring to FIG. 4B, in the scene 420, an action of an apparatus user is predicted to correspond to a "handshaking" action. In this example, AR functions mapped to the handshaking action may include a function of recognizing another party or individual with whom a user shakes hands, and a function of displaying information about the other individual around the other individual. The AR apparatus may execute the above AR functions based on the control of the server. For example, in FIG. 4B, the other party may be recognized in the AR apparatus, and a name of the other party "OOO" and an identity of the other party as a "business owner" may be displayed as information about the other party in the AR apparatus.

Referring to FIG. 4C, in the scene 430, an action of an apparatus user is predicted to correspond to a "smoking" action. In this example, AR functions mapped to the smoking action may include a function of displaying whether a user is currently located in a smoking area and a function of guiding a nearest smoking area. The AR apparatus executes the above AR functions based on the control of the server. For example, in FIG. 4C, a current location corresponding to a "smoking area", and a distance to a nearby smoking area and navigation information may be displayed on the AR apparatus.

An example of a first-person video will be described below. The above description of FIGS. 4A-4C may also apply to an example of a first-person video. For example, a camera may be installed in an AR apparatus, a first-person video corresponding to a viewpoint of an apparatus user may be captured with the camera. Actions such as eating, handshaking, or smoking may be predicted based on the captured first-person video. In this example, AR functions may be executed in the AR apparatus in the same manner as those described above.

Figure 5:
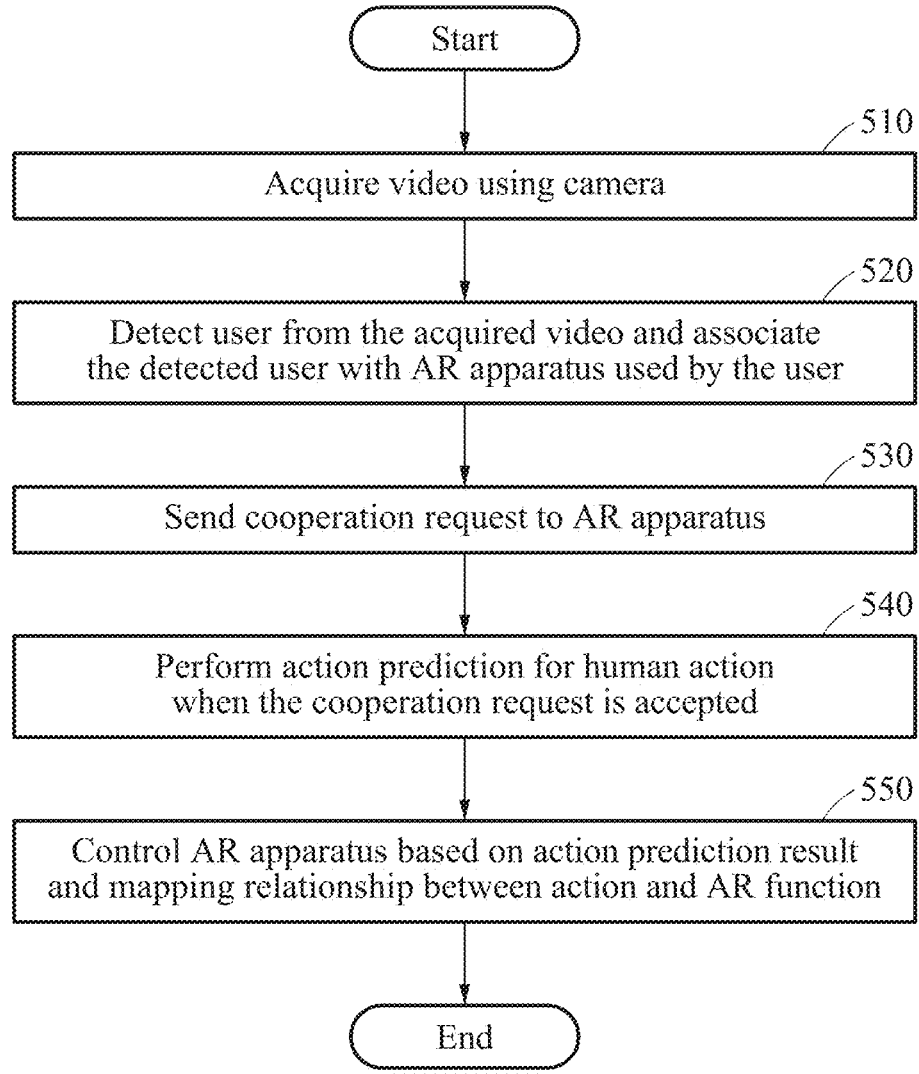
FIG. 5 is a flowchart illustrating an example of an operating method of a server to control an AR apparatus, in accordance with one or more embodiments.

FIG. 5 is a flowchart illustrating an example of an operating method of a server to control an AR apparatus. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, in operation 510, the server acquires a video with a camera. In operation 520, the server detects a user from the acquired video and associates the detected user with an AR apparatus used by the detected user.

For example, the server may perform a human body tracking on the video, perform a face detection of the tracked human body, and acquire a face image area. The server may retrieve a matching user from an AR user DB through a facial recognition process. The AR user DB may include at least one of a facial image of a user and apparatus information of the user.

When an image that matches the user cannot be retrieved from the AR user DB, the server may terminate a current operation. When an image that matches the user is retrieved from the AR user DB, the server may acquire information (for example, an apparatus model, a model ID, a wireless communication address, or a network card address) about an AR apparatus associated with the user, and may establish a communication with the AR apparatus. For example, the server may establish the communication with the AR apparatus through an AR program manager of the AR apparatus of the user, and request the AR program manager to accept an automatic control method of initiating a cooperation with the server.

In operation 530, the server sends a cooperation request to the AR apparatus. When the AR apparatus accepts the cooperation request, the server performs an action prediction for a human action in operation 540. In operation 550, the server controls the AR apparatus based on an action prediction result and a mapping relationship between an action and an AR function. For example, the server may transmit, to the AR program manager, a control command to execute an AR function designated by the server.

Figure 6:
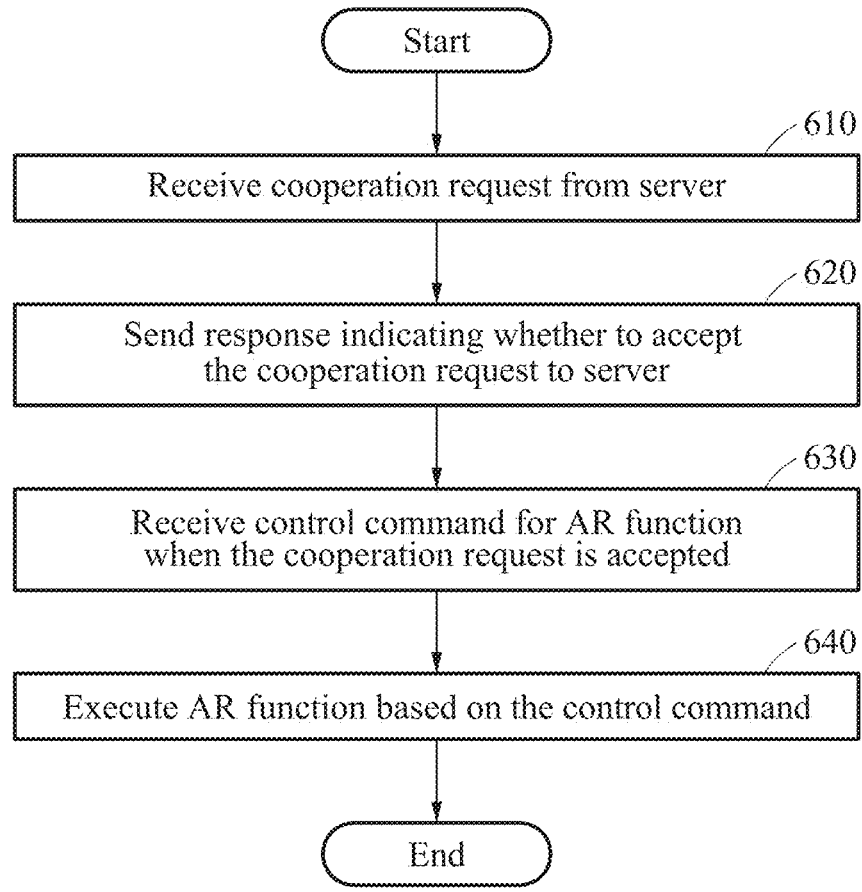
FIG. 6 is a flowchart illustrating an example of an operating method of an AR apparatus, in accordance with one or more embodiments.

FIG. 6 is a flowchart illustrating an example of an operating method of an AR apparatus. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, the AR apparatus receives a cooperation request from a server in operation 610, and sends a response indicating whether to accept the cooperation request to the server in operation 620. For example, the AR apparatus may receive a request for an automatic control method to initiate a cooperation with the server from the server. In this example, the AR apparatus may correspond to, for example, an AR program manager of the AR apparatus. The AR program manager may determine whether to accept the request for the automatic control method to initiate the cooperation with the server based on settings of the AR apparatus. When the request is accepted, the AR apparatus may transmit a response to the request to the server.

When the cooperation request is accepted, the AR apparatus receives a control command for an AR function in operation 630, and executes the AR function based on the control command in operation 640. In an example, the AR apparatus may receive, from the server, a command to execute an AR function corresponding to a predicted human body action. For example, the server may predict a human body action in a video acquired by a camera, and may determine an AR function corresponding to the predicted human body action based on a mapping relationship between a predefined action and an AR function. When the AR function is determined, the AR apparatus may execute the AR function based on a command of the server.

Figure 7:
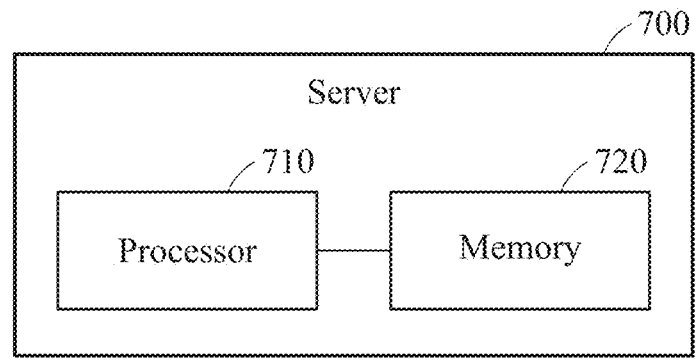
FIG. 7 is a block diagram illustrating an example of a server, in accordance with one or more embodiments.

FIG. 7 is a block diagram illustrating an example of a server 700 in accordance with one or more embodiments.

Referring to FIG. 7, the server 700 may include a processor 710 and a memory 720.

The processor 710 may be a single processor, or a combination of a plurality of processors. For example, when the server 700 includes a plurality of processors 710, the processors 710 may be used to perform different operations. The memory 720 stores instructions executable in a computer. When the instructions are executed by the one or more processors 710, the one or more processors 710 may perform any one or any combination of operations associated with the above-described AR apparatus control method. For example, when an instruction is executed by the one or more processors 710, the one or more processors 710 may acquire a video, may detect a human body from the acquired video, may perform an action prediction for the detected human body, and may control the AR apparatus based on a result of the action prediction and a mapping relationship between actions and AR functions.

To detect a user from the acquired video and to associate the detected user with a corresponding AR apparatus, the processor 710 may perform a human body tracking on the captured video, may perform a face detection on the tracked human body, may acquire a face image area, and may retrieve a matching user from an AR user DB through a facial recognition process. The AR user DB may include at least one of a face image and apparatus information of a user. When the matching user is retrieved from the AR user DB, the processor 710 may acquire information (for example, an apparatus model, a model ID, a wireless communication address, or a network card address) about an AR apparatus associated with the user, and may establish a communication with the AR apparatus.

For example, when a plurality of AR functions matches a predicted action of a user, the processor 710 may select at least one AR function from the plurality of AR functions, and may transmit a control command for the selected AR function to the AR apparatus. The processor 710 may update a state of a current human body action based on an action prediction result of a user, and may transmit, to the AR apparatus, a command to terminate an AR function that does not match the current human body action based on a mapping relationship between a human body action and an AR function.

Figure 8:
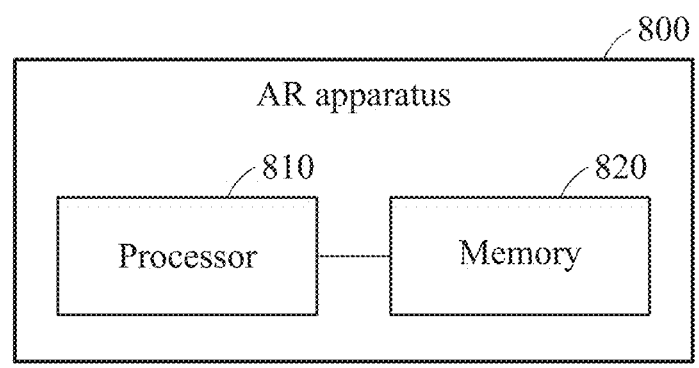
FIG. 8 is a block diagram illustrating an example of an AR apparatus, in accordance with one or more embodiments.

FIG. 8 is a block diagram illustrating an example of an AR apparatus 800, in accordance with one or more embodiments. Referring to FIG. 8, the AR apparatus 800 may include a processor 810 and a memory 820. The processor 810 may be a single processor, or a combination of a plurality of processors. For example, when the AR apparatus 800 may include a plurality of processors 810, the processors 810 may perform different operations. The memory 820 stores instructions executable in a computer. When the instructions are executed by the one or more processors 810, the one or more processors 810 may perform any one or any combination of operations associated with an execution of the above-described AR functions.

For example, when an instruction is executed by the one or more processors 810, the one or more processors 810 may acquire a video, may detect a human body from the acquired video, may perform an action prediction for the detected human body, and may execute an AR function based on a result of the action prediction and a mapping relationship between actions and AR functions. In this example, a server may predict a human body action in a captured video acquired by a camera, and may determine an AR function corresponding to the predicted human body action based on a mapping relationship between a predefined action and an AR function.

In an example, when a plurality of AR functions corresponding to a predicted action of a user are received, the processor 810 may select at least one AR function from the plurality of AR functions and may execute the selected AR function. When a state of a current human body action is updated, the processor 810 may receive, from the server, a command to terminate an AR function that does not match the current human body action, and may terminate the AR function based on the command.

Figures 9A, 9B:
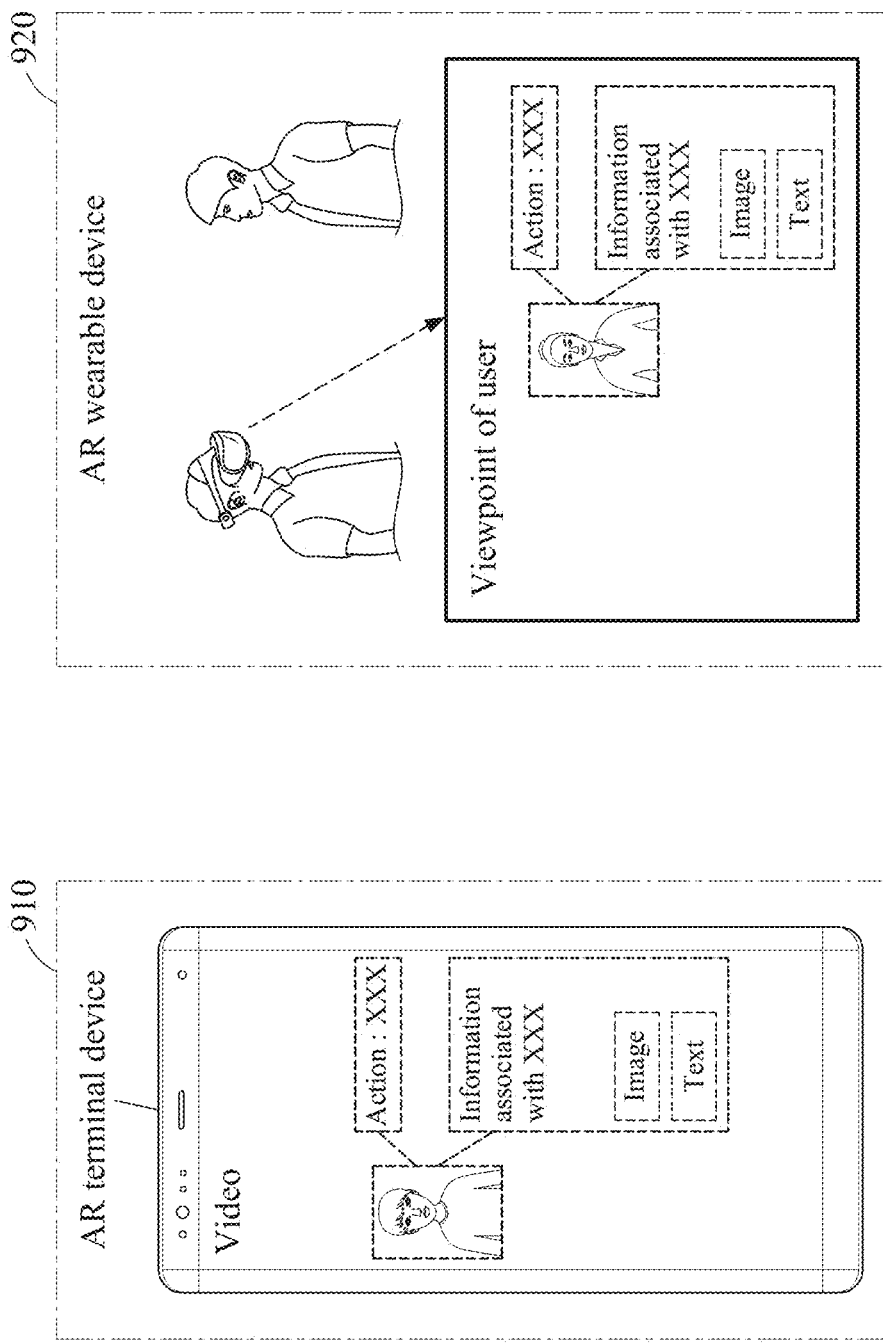
FIGS. 9A and 9B illustrate examples of an AR system environment, in accordance with one or more embodiments.

FIGS. 9A and 9B illustrate an example of an AR system environment. In FIGS. 9A and 9B, an AR terminal device 910 and an AR wearable device 920 correspond to AR apparatuses.

Referring to FIG. 9A, the AR terminal device 910 may play back a video (hereinafter, referred to as a "prestored video") that is generated and stored in advance in an AR apparatus. The AR terminal device 910 may acquire the video through a memory of the AR terminal device 910 or via a network connection. The AR terminal device 910 executes an AR function associated with the prestored video. For example, the AR terminal device 910 may acquire the video, detects a human body from the acquired video, perform an action prediction for the detected human body, and execute an AR function based on a result of the action prediction and a mapping relationship between actions and AR functions.

In this example, the prestored video is played back, and an AR function corresponding to an action of another user appearing in the video that is being played back is applied. For example, a type of an action of another user appearing in a video that is being played back and information (for example, an image or text) associated with the action may be superimposed and displayed on the video. The AR terminal device 910 may store a video application with an AR function, and may provide the AR function while playing back a video using the video application.

Referring to FIG. 9B, the AR wearable device 920 captures a video (for example, a first-person video) from a viewpoint of an apparatus user with a camera connected to the AR wearable device 920. The AR wearable device 920 may include, for example, a head-mounted display (HMD) or smart glasses that provide an AR function. The AR wearable device 920 may capture a first-person video in real time, and execute an AR function associated with the first-person video. For example, the AR wearable device 920 may acquire a video, detect a human body from the acquired video, perform an action prediction for the detected human body, and execute an AR function based on a result of the action prediction and a mapping relationship between actions and AR functions.

In this example, an AR function corresponding to an action of another user appearing in the first-person video may be applied. For example, a type of an action of another user appearing in the first-person video and information (for example, an image or text) associated with the action may be superimposed and displayed on the first-person video. In an example, when a part of a body of an apparatus user appears in a first-person video, an AR function may be applied to an action of the apparatus user. For example, when a hand of an apparatus user appears in a first-person video, and when smoking is predicted based on the hand of the apparatus user, an AR function associated with smoking may be executed.

Figure 10A:
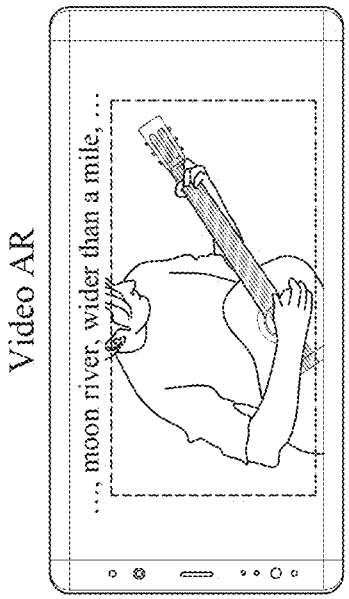
FIGS. 10A-10C illustrate examples of application scenes of an AR terminal device, in accordance with one or more embodiments.
Figure 10B:
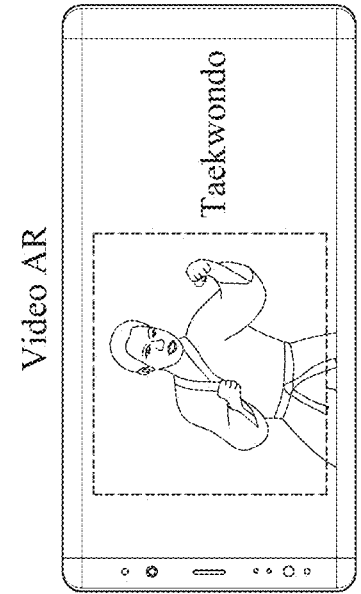
Figure 10C:
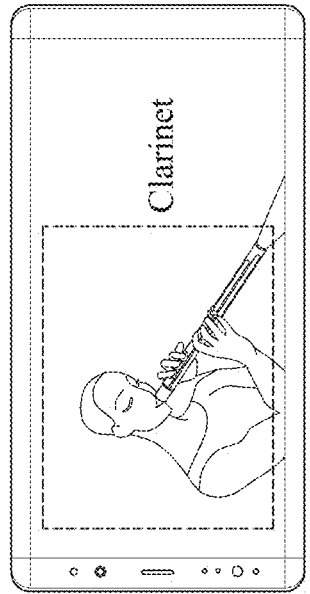

FIGS. 10A-10C illustrate examples of application scenes of an AR terminal device. In each of scenes 1010 (FIG. 10A), 1020 (FIG. 10B) and 1030 (FIG. 10C), a video is played back and an action of a user, other than a user of the AR terminal device appearing in the video, is predicted. Also, an AR function associated with the predicted action may be executed.

Referring to FIG. 10A, in the scene 1010, an action of another user is predicted as a "singing" action. As AR functions corresponding to the singing action, a function of predicting a song and retrieving the song from the Internet or a song DB of a local memory, and a function of displaying information about a song are executed. In an example, a microphone attached to the AR terminal device may detect a song being sang by the other user. The detected song may then be retrieved from the Internet or a song DB of a local memory, and a function of displaying information about the detected song are executed.

Referring to FIG. 10B, in the scene 1020, an action of another user is predicted as a "martial art" action. As AR functions corresponding to the martial art, a function of recognizing a type of the martial art, and a function of displaying information about the type of martial art are executed.

Referring to FIG. 10C, in the scene 1030, an action of another user is predicted as an "instrument playing" action. As AR functions corresponding to the instrument playing action, a function of predicting a musical instrument and a function of displaying information about the musical instrument are executed.

Figure 11:
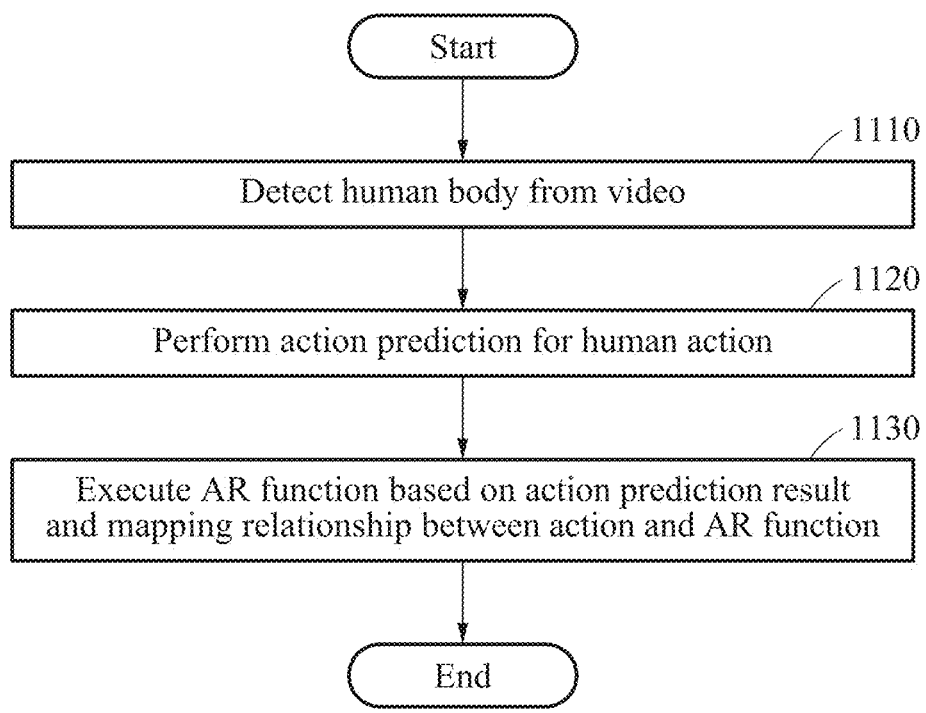
FIG. 11 is a flowchart illustrating another example of an operating method of an AR apparatus, in accordance with one or more embodiments.

FIG. 11 is a flowchart illustrating another example of an operating method of an AR apparatus. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer that perform the specified functions, or combinations of special purpose hardware and computer instructions. In addition to the description of FIG. 11 below, the descriptions of FIGS. 1-10 are also applicable to FIG. 11, and are incorporated herein by reference. Thus, the above description may not be repeated here.

Referring to FIG. 11, in operation 1110, the AR apparatus detects a human body from a video image captured in operation 1110, performs an action prediction for a human action in operation 1120, and executes an AR function based on an action prediction result and a mapping relationship between an action and an AR function in operation 1130. The AR apparatus may correspond to, for example, an AR terminal device or an AR wearable device. For example, when the AR apparatus corresponds to an AR terminal device, the video may correspond to a prestored video. When the AR apparatus corresponds to an AR wearable device, the video may correspond to a first-person video. As described above, a process of applying an AR function may vary depending on whether the AR apparatus is an AR terminal device or an AR wearable device.

For example, when a plurality of AR functions corresponds to a predicted action, the AR apparatus may select and execute at least one of the plurality of AR functions. When a state of a current human body action is updated, the AR apparatus may terminate an AR function that does not match the current human body action.

Figure 12:
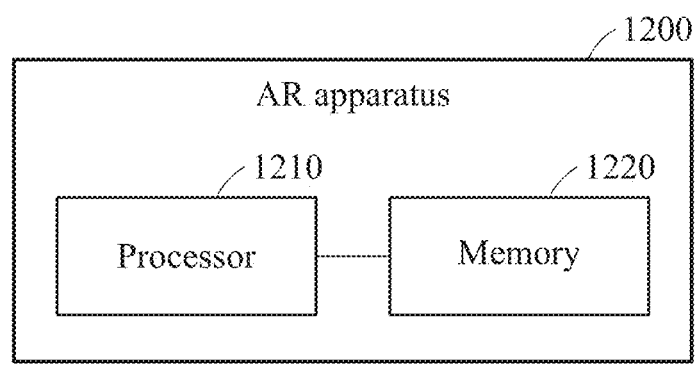
FIG. 12 is a block diagram illustrating an example of an AR apparatus, in accordance with one or more embodiments.

FIG. 12 is a block diagram illustrating an example of an AR apparatus 1200. Referring to FIG. 12, the AR apparatus 1200 includes a processor 1210 and a memory 1220.

The processor 1210 may be a single processor, or a combination of a plurality of processors. For example, when the AR apparatus 1200 includes a plurality of processors 1210, the processors 1210 may be used to perform different operations. The memory 1220 stores instructions executable in a computer. When the instructions are executed by the one or more processors 1210, the one or more processors 1210 may perform any one or any combination of operations associated with an execution of the above-described AR functions.

For example, when an instruction is executed by the processor 1210, the one or more processors 1210 may detect a human body from an acquired video, may perform an action prediction for the detected human body, and may execute an AR function based on a result of the action prediction and a mapping relationship between actions and AR functions. In this example, the AR apparatus 1200 may correspond to, for example, an AR terminal device or an AR wearable device. When the AR apparatus 1200 corresponds to an AR terminal device, the video may correspond to a prestored video. When the AR apparatus 1200 corresponds to an AR wearable device, the video may correspond to a first-person video. As described above, a process of applying an AR function may vary depending on whether the AR apparatus 1200 is an AR terminal device or an AR wearable device.

As described above, the action prediction may be performed by various examples. In an example, the action prediction may be performed by fusing classification results based on a plurality of action classification schemes. In another example, the action prediction may be performed by fusing a feature associated with a human body pose action and a feature associated with an interactive action. Hereinafter, each example for the action prediction will be further described.

Figure 13:
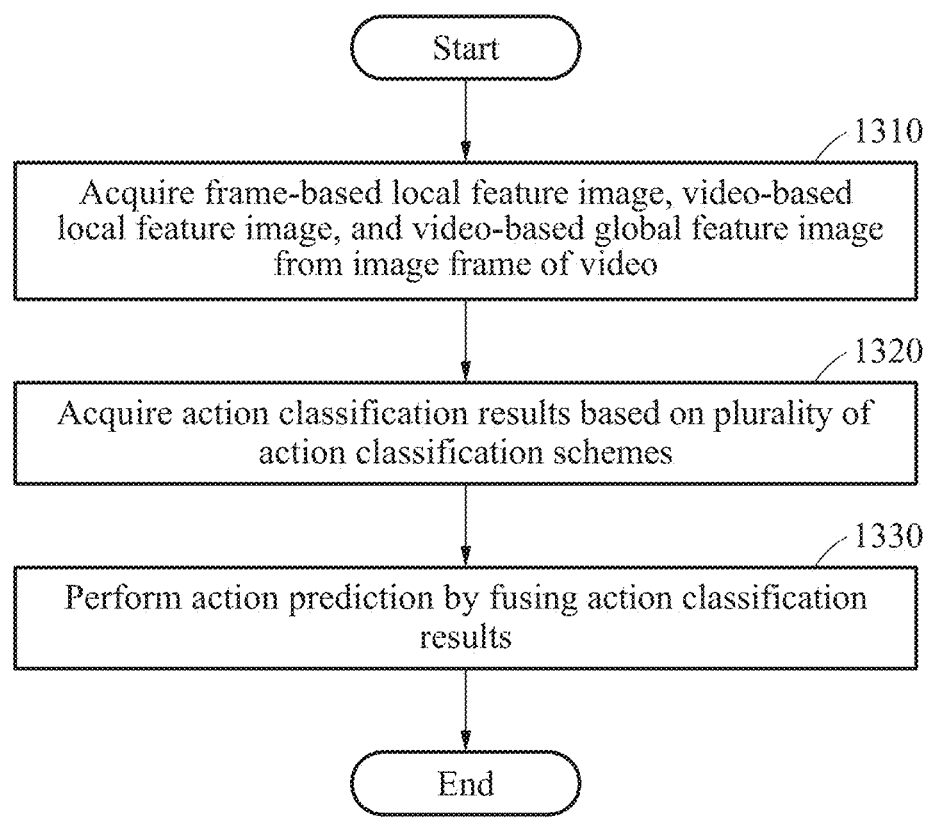
FIG. 13 is a flowchart illustrating an example of an action prediction method, in accordance with one or more embodiments.

FIG. 13 is a flowchart illustrating an example of an action prediction method. The operations in FIG. 13 may be performed in the sequence and manner as shown, although the order of some operations may be changed or some of the operations omitted without departing from the spirit and scope of the illustrative examples described. Many of the operations shown in FIG. 13 may be performed in parallel or concurrently. One or more blocks of FIG. 13, and combinations of the blocks, can be implemented by special purpose hardware-based computer that perform the specified functions, or combinations of special purpose hardware and computer instructions. In addition to the description of FIG. 13 below, the descriptions of FIGS. 1-12 are also applicable to FIG. 13, and are incorporated herein by reference. Thus, the above description may not be repeated here.

Referring to FIG. 13, in operation 1310, a frame-based local feature image, a video-based local feature image, and a video-based global feature image are acquired from an image frame of a video including a human body.

In an example, a frame-based global feature image may be generated by extracting a feature from an image sequence of a temporal-spatial domain of an image frame using a 3D CNN, and a region of interest (ROI) candidate may be determined from the frame-based global feature image using a regional recommendation network (RPN). A ROI pooling using the ROI candidate may be performed on the image frame, and a frame-based local feature image may be torn from the frame-based global feature image. Also, a video-based local feature image may be generated by performing a ROI sorting on the frame-based local feature image, and a video-based global feature image may be generated based on the frame-based global feature image and the video-based local feature image.

For example, a feature may be extracted from each of "N" image frames selected from an input video, and "N" frame-based global feature images may be acquired. In this example, "N" is a positive integer. The "N" frame-based global feature images may correspond to the "N" image frames, and each of the "N" image frames may include a plurality of layers. The plurality of layers may correspond to feature images with various degrees of abstraction. The expression "frame-based" used herein indicates that feature images of a plurality of acquired layers correspond to one image frame.

In an example, at least one ROI candidate may be extracted from each of the "N" frame-based global feature images. The ROI candidate indicates an image area of a user including user-related content in an image frame. For example, the ROI candidate may be a human body position box on an image frame having a boundary including an image area of a user who performs an action. The ROI candidate may be specified by a position and a size in the image frame.

In an example, "N" frame-based local feature images may be acquired based on the "N" frame-based global feature images and at least one ROI candidate extracted from each of the "N" frame-based global feature images. A frame-based local feature image may correspond to a local portion based on a ROI candidate of a frame-based global feature image. The acquired "N" frame-based local feature images may indicate local portions corresponding to "N" ROI candidates representing image areas including the same user-related content as that of the "N" frame-based global feature images. The expression "frame-based local feature image" used herein indicates that feature images of a plurality of acquired layers correspond to a local portion of one image frame.

In operation 1320, action classification results based on a plurality of action classification schemes are acquired. Human body actions are classified by any one or any combination of three schemes that will be described below. For example, any two or any combination of the three schemes may be used to classify human body actions.

(1) Human body actions may be classified based on a frame-based local feature image and a human body pose feature. For example, for an action of a user, a human body part may be acquired based on "N" frame-based local feature images and a human body part analysis, a human body pose feature of a human body part may be determined based on the human body part, and a human body action may be classified based on the human body pose feature. The above scheme is referred to as a "human body pose feature-based human body action classification scheme".

(2) Video-based local feature images may be acquired based on frame-based local feature images, and human body actions may be classified based on the video-based local feature images. For example, video-based local feature images may be acquired based on "N" frame-based local feature images, and actions of a user may be classified based on the video-based local feature images. The above scheme is referred to as a "local feature-based human body action classification scheme".

(3) Video-based local feature images may be acquired based on frame-based local feature images, and human body actions may be classified based on the video-based local feature images and video-based global feature images. For example, video-based local feature images may be acquired based on "N" frame-based global feature images, and human body actions may be classified based on the video-based local feature image and the "N" frame-based global feature images. The above scheme is referred to as a "global-local feature fusion-based human body action classification scheme".

A video-based local feature image corresponds to a feature transformation or a feature concatenation of "N" frame-based local feature images. The expression "video-based local feature image" used herein indicates that a feature image of a plurality of acquired layers corresponds to a feature transformation or a feature concatenation of a plurality of layers of each of local portions corresponding to "N" image frames of a video.

In operation 1330, an action prediction is performed by fusing the action classification results. For example, action classification results acquired by at least two of the above three schemes may be fused. By performing a human body part analysis and a global-local feature fusion, subtle differences between actions may be effectively distinguished.

In an example, either a 3D CNN or a 2D CNN may be used for a feature extraction of each image frame. Each example will be further described below.

Figure 14:
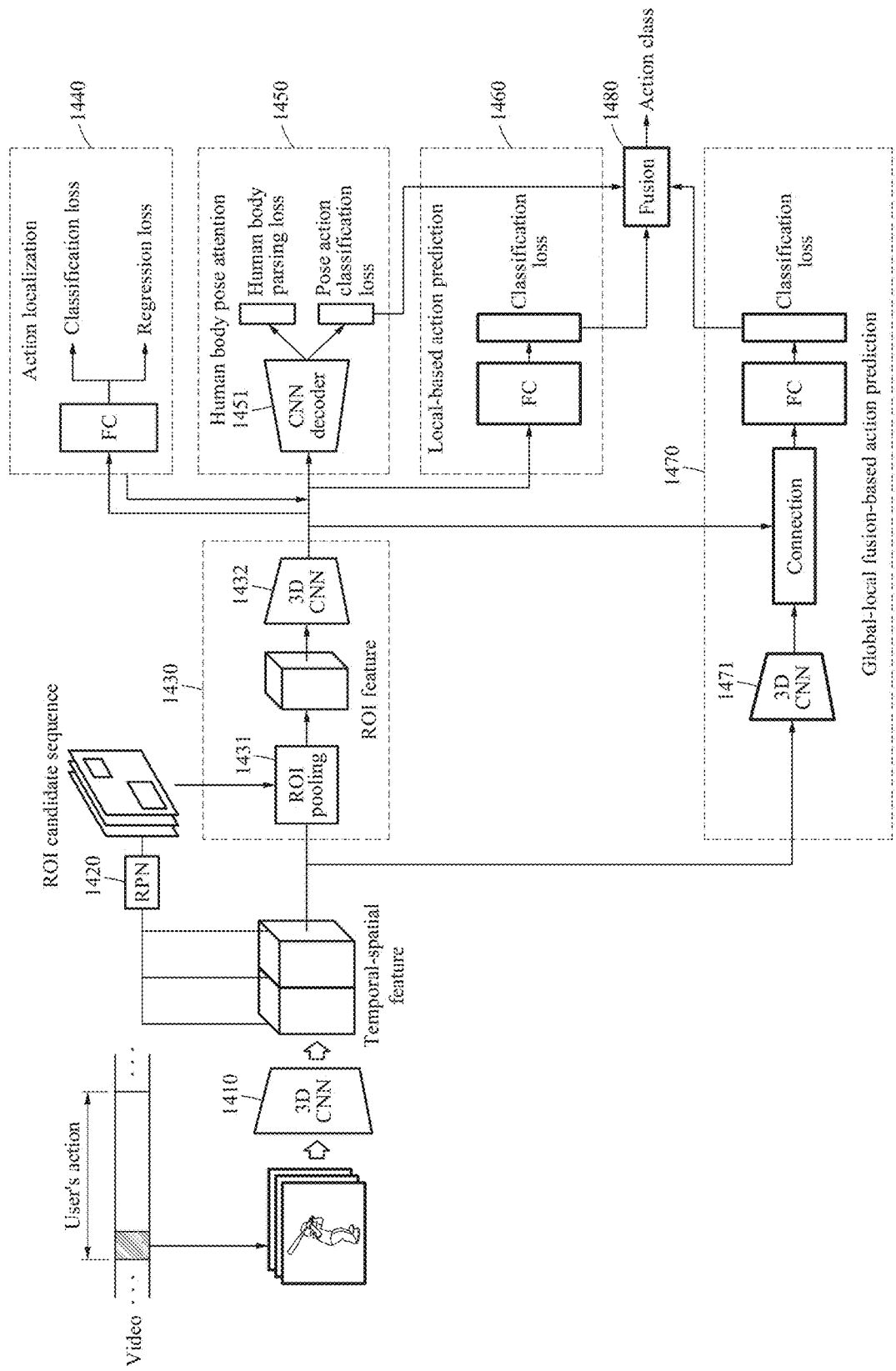
FIG. 14 illustrates an example of an action prediction process implementing a three-dimensional (3D) convolutional neural network (CNN), in accordance with one or more embodiments.

FIG. 14 illustrates an example of an action prediction process implementing a 3D CNN.

Referring to FIG. 14, at least a portion of image frames is extracted from a video including a human body action and may be input to a 3D CNN 1410. For example, each of the image frames may correspond to a color image, and may have, for example, a dimension of H×W×T×3. The 3D CNN 1410 generates frame-based global feature images of image frames at different times based on spatial domains of the image frames and temporal domains of the image frames. For example, "N" image frames of an input video may pass through the 3D CNN 1410, a feature of a corresponding image frame may be extracted from a spatial domain and a temporal domain of each of the "N" image frames, and "N" frame-based global feature images may be generated. A frame-based global feature image may correspond to a temporal-spatial feature.

An RPN 1420 may extract a ROI candidate from each of the frame-based global feature images and generate a ROI candidate sequence. For example, when "M" ROI candidates are assumed to be extracted from each frame-based global feature image, "M" ROI candidate sequences may be generated. In this example, M is a positive integer. Each of the ROI candidate sequences may include "N" ROI candidates corresponding to image areas including the same human body-related content of "N" image frames. For example, each of the ROI candidate sequences may be "N" boxes of which positions are changed over time, and the same human body-related content may be included in a boundary of each of the boxes.

Through a ROI pooling 1431, frame-based local feature images are extracted from the frame-based global feature images based on the ROI candidate sequences. For example, through the ROI pooling 1431 based on each of the ROI candidate sequence, "N" frame-based local feature images may be extracted from "N" frame-based global feature images.

In a block 1430, a ROI sorting of the "N" frame-based local feature images is performed based on a corresponding ROI candidate sequence, and features corresponding to a result obtained by the ROI sorting may be additionally extracted using a 3D CNN 1432. Thus, "M" video-based local feature images may be acquired for each of the "M" ROI candidate sequences. The "M" video-based local feature images may be output from the block 1430.

In a block 1440, a localization of a human body action is performed on the video-based local feature images, and at least a portion of the video-based local feature images is selected. For example, a localization of "M" video-based local feature images may be performed, and a number (for example, "1") of video-based local feature images to be selected may be less than "M". A position box of a human body performing an action may be output from the block 1440. For example, a box of an image area of a human body performing smoking may be output.

A process of the block 1440 is performed through a fully connected (FC) network that includes an FC branch for classification and an FC branch for regression. A classification branch may be used to determine which ROI candidate includes a human body. The classification branch may perform training using a logistic regression function as a loss function of classification. A regression branch may be used to train a position of a box including a human body. The regression branch may perform training using a position deviation loss function as a regression loss function. Through training, a predetermined video-based local feature image used to classify a human body action may be selected from the "M" video-based local feature images in the block 1440.

Using the selected video-based local feature image as an input, a process of blocks 1450, 1460 and 1470 may be performed. In the blocks 1450, 1460 and 1470, a human body action classification is performed based on a human body pose feature-based scheme, a local feature-based scheme and a global-local feature fusion-based scheme. The above schemes are briefly illustrated as "human body pose attention", "local-based action prediction" and "global-local fusion-based action prediction" in FIG. 14. All the above action classification schemes do not need to be performed, and a human body action classification may be performed based on any one or any combination (for example, two or more) of the above schemes. An output of each operation may be a probability vector of a human body action, and each element of the probability vector may indicate a probability that a human body performs an action, which will be further described below.

In a block 1480, results acquired by performing the human body action classification using any one (for example, any two) or any combination of the above three schemes are fused, and an action classification based on a fusion result is performed. A class of a human body action may be predicted based on a classification result. For example, probability vectors of three actions obtained using the above three schemes may be classified through one FC layer after a 1×1 convolution fusion. A classification result may be output as a prediction result of a human body action. For example, an output of a classification may have an action label with a highest probability, for example, an action such as handshaking or smoking.

Hereinafter, a process of classifying a human body action using the above three schemes is further described.

(1) Human Body Pose Feature-Based Human Body Action Classification Scheme

When a video-based local feature image is selected through the localization of the human body action in the block 1440, a 3D CNN decoding may be performed on the selected video-based local feature image in the block 1450. The 3D CNN-decoded video-based local feature image may include a human body pose feature that is based on a human body part. A human body action may be classified based on the 3D CNN-decoded video-based local feature image including the human body pose feature. For example, an action classification may be performed using a human body pose feature-based human body action classification scheme, based on the human body pose feature and a human body part parsing result. A human body parsing process will be further described below.

For example, a 3D CNN decoder 1451 performs a localization of a human body part through a human body part analysis, and allows a selected video-based local feature image to include a human body part-based human body pose feature. In an example, the 3D CNN decoder 1451 may include a 3D deconvolution network, and may be configured to gradually increase a resolution of a video-based local feature image through a deconvolution and upsampling process, to perform a localization of a human body part through a human body part analysis, to perform a 3D CNN decoding on one video-based local feature image selected from "M" video-based local feature images, to acquire a 3D CNN-decoded video-based local feature image, and to allow the 3D CNN-decoded video-based local feature image to include a human body part-based human body pose feature.

(2) Local Feature-Based Human Body Action Classification Scheme

When a video-based local feature image is selected through the localization of the human body action in the block 1440, a human body action may be classified based on the selected video-based local feature image in the block 1460.

(3) Global-Local Feature Fusion-Based Human Body Action Classification Scheme.

When a video-based local feature image is selected through the localization of the human body action in the block 1440, a human body action may be classified based on the selected video-based local feature image and "N" frame-based global feature images in the block 1470. For example, a video-based global feature image may be acquired by extracting an additional feature from the "N" frame-based global feature images using a 3D CNN 1471. In this example, the expression "video-based global feature image" used herein indicates that a feature image of a plurality of acquired layers corresponds to a feature transformation of a plurality of layers of global images corresponding to "N" image frames of a video. A feature concatenation of the video-based global feature image and the selected video-based local feature image may be performed, and an action classification may be performed based on a feature image of a plurality of layers after the feature concatenation.

Figure 15:
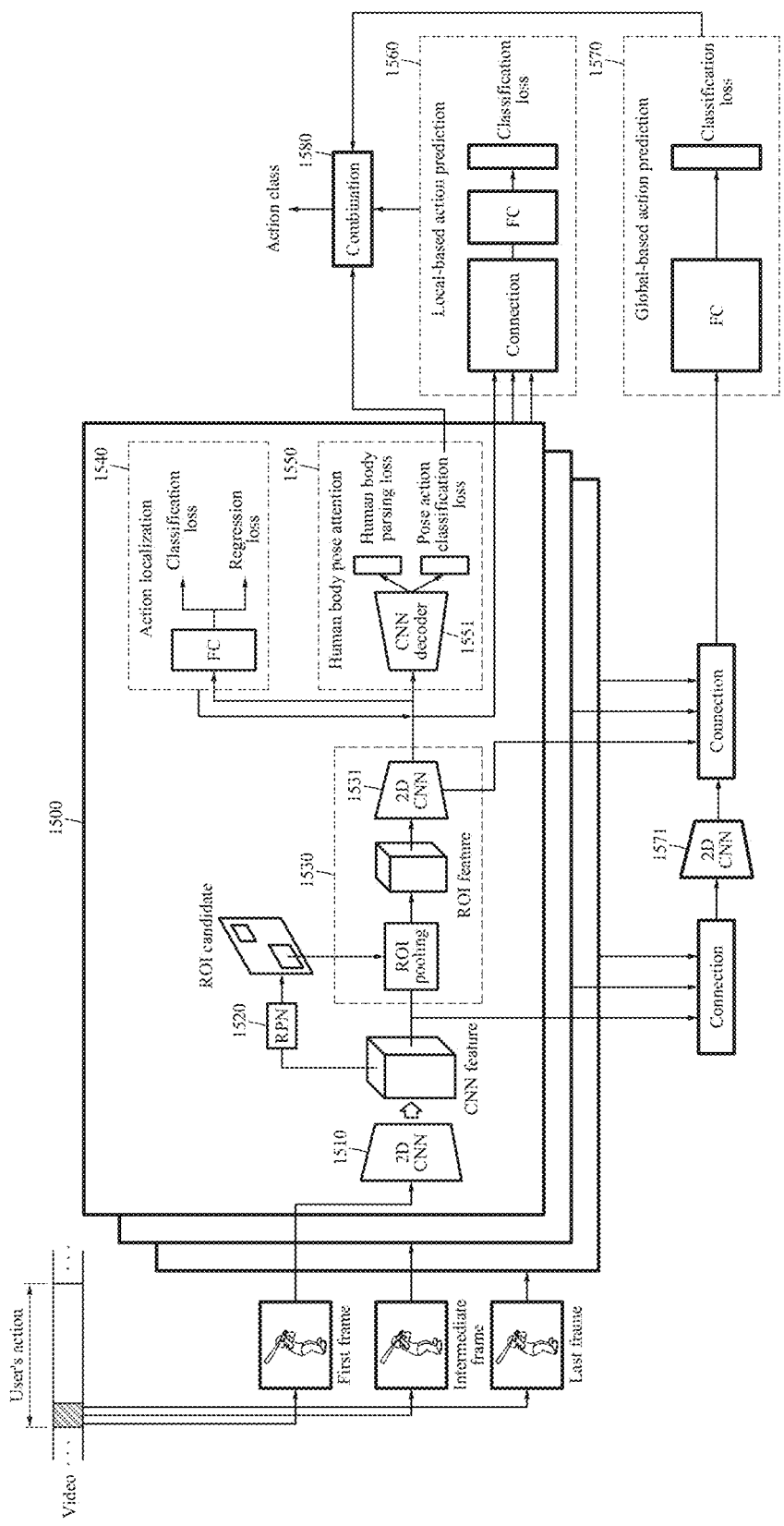
FIG. 15 illustrates an example of an action prediction process implementing a two-dimensional (2D) CNN, in accordance with one or more embodiments.

FIG. 15 illustrates an example of an action prediction process using a 2D CNN. Referring to FIG. 15, a plurality of image frames may be selected from an input video. For example, three image frames including a first frame, an intermediate frame and a last frame may be selected. A block 1500 corresponds to a processing of the first frame. A type of an action may be predicted based on processing results associated with the other frames corresponding to the block 1500. Also, at least a portion of an action prediction process using a 3D CNN may apply to an action prediction process using a 2D CNN.

Through a 2D CNN 1510, a frame-based global feature image is acquired from an image frame. For example, "N" frame-based global feature images may be extracted from "N" image frames through a 2D CNN. Through a RPN 1520, "M" ROI candidates are extracted from a frame-based global feature image of each image frame. In a block 1530, for each of the plurality of image frames, a frame-based local feature image is acquired from a frame-based global feature image of an image frame through a ROI pooling of each of the "M" ROI candidates. Thus, "M" frame-based local feature images corresponding to the "M" ROI candidates may be acquired. Through a 2D CNN 1531, a feature extraction is additionally performed.

In a block 1540, a localization of a human body action is performed based on the frame-based local feature image, and one frame-based local feature image is selected from a plurality of frame-based local feature images. For example, the localization of the human body action may be performed based on "M" frame-based local feature images of each image frame. A human body action may be easily classified based on the selected frame-based local feature image.

Similar to a human body action prediction method using a 3D CNN, a processing of the block 1540 may also be performed through an FC network. The FC network may include a classification branch and a regression branch. The classification branch may be used to determine which ROI candidate includes a human body. The classification branch may perform training using a logistic regression function as a loss function of classification. After training, in the block 1540, one frame-based local feature image may be selected from the "M" frame-based local feature images and a human body action may be classified based on the selected frame-based local feature image.

In a block 1550, for each of the image frames, a human body action is classified using a human body pose feature-based human body action classification scheme, in response to an input of the selected frame-based local feature image. In an example, an action classification may be performed using the human body pose feature-based human body action classification scheme, based on a human body pose feature and a human body part parsing result. A human body parsing process will be further described below.

Hereinafter, a process of classifying a human body action using three schemes is further described.

(a) Human Body Pose Feature-Based Human Body Action Classification Scheme

In the block 1550, a human body action is classified based on a selected frame-based local feature image of each image frame and a human body part-based human body pose feature acquired through a human body part analysis. In a block 1580, human body action classification results for each image frame are combined. For example, a localization of a human body part may be performed through the human body part analysis so that a 2D CNN-decoded frame-based local feature image acquired by performing a 2D CNN decoding on a frame-based local feature image may include a human body part-based human body pose feature, and a human body action may be classified based on the 2D CNN-decoded frame-based local feature image that is based on the human body pose feature.

For example, a CNN decoder 1551 may include a 2D deconvolution network, and may be configured to gradually increase a resolution of a frame-based local feature image through a deconvolution and upsampling, to perform a localization of a human body part through a human body part analysis, and to perform a 2D CNN decoding on the frame-based local feature image. Thus, the 2D CNN-decoded frame-based local feature image may include the human body part-based human body pose feature.

(2) Local Feature-Based Human Body Action Classification Scheme

In a block 1560, a video-based local feature image is acquired based on "N" frame-based local feature images selected for each of "N" image frames. Acquired "N" frame-based local feature images indicate local portions corresponding to "N" ROI candidates representing image areas including the same human body-related content as that of "N" frame-based global feature images. The video-based local feature image may be a feature concatenation of the "N" frame-based local feature images. A human body action may be classified based on the video-based local feature image.

(3) Global-Local Feature Fusion-Based Human Body Action Classification Scheme

In a block 1570, a video-based local feature image is acquired based on "N" frame-based local feature images selected for each of "N" image frames. Acquired "N" frame-based local feature images indicate local portions corresponding to "N" ROI candidates representing image areas including the same human body-related content as that of "N" frame-based global feature images. The video-based local feature image may be a feature concatenation of the "N" frame-based local feature images. A human body action may be classified based on a selected video-based local feature image and the "N" frame-based global feature images.

For example, a video-based global feature image may be acquired by performing an additional feature extraction from "N" frame-based global feature images through a 2D CNN 1571, and a feature concatenation of the video-based global feature image and a selected video-based local feature image may be performed. A human body action may be classified based on a feature image of a plurality of layers after the feature concatenation.

Figure 16:
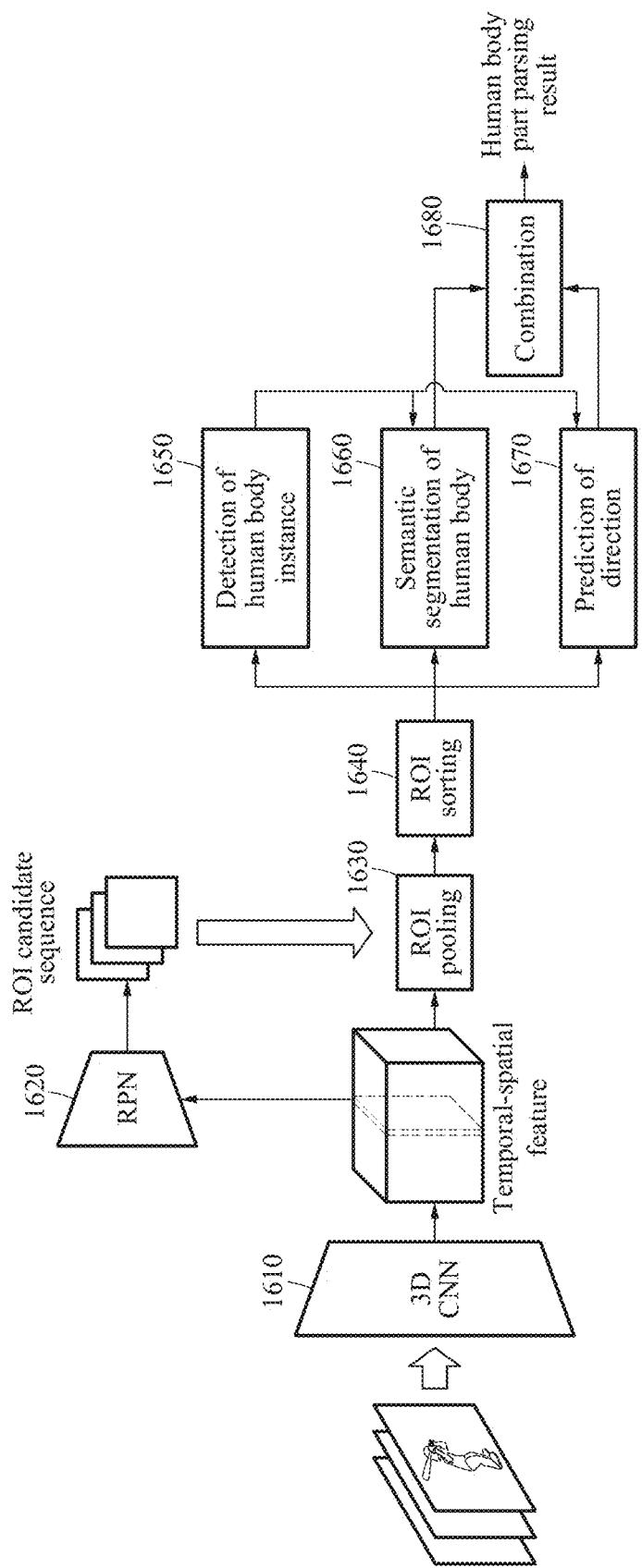
FIG. 16 illustrates an example of a human body part parsing process, in accordance with one or more embodiments.

FIG. 16 illustrates an example of a human body part parsing process. One of the purposes of a human body part analysis may be to separate a plurality of human body instances shown in an image and to divide each of the separated human body instances into more detailed parts (for example, a head, an arm or a leg) of a human body. By assigning a label of one body part to each pixel in the image, a more accurate human body pose attention feature may be provided to a human body action prediction method, and thus it is possible to increase an accuracy of an action prediction.

In an example, to perform a human body part analysis, a human body detection and a human body segmentation may be combined. Through a 3D CNN 1610, a feature may be extracted from an image sequence of a temporal-spatial domain. Also, through an RPN 1620, a ROI candidate sequence may be determined, and a video-based local feature image may be generated through a ROI pooling 1630 using the ROI candidate sequence, and through a ROI sorting 1640. The description provided with reference to FIG. 14 may apply to the 3D CNN 1610, the RPN 1620, the ROI pooling 1630 and the ROI sorting 1640. Also, the human body part parsing process of FIG. 16 may be used in an example of a 2D CNN of FIG. 15 by replacing the 3D CNN 1610 with a 2D CNN.

Video-based local feature images acquired after the ROI sorting 1640 are input to three branches, respectively. A first branch 1650 is a human body instance branch. In the first branch 1650, a human body instance is detected, and an image area of the human body instance is determined within an image frame of a video. For example, a position regression of the ROI candidate sequence may be performed, and an image area of the human body instance may be determined within each of a plurality of image frames of a video.

A second branch 1660 is a human body semantic segmentation branch. In the second branch 1660, an approximate semantic segmentation result is acquired by performing an approximate partial semantic segmentation on a human body image area candidate extracted from the image area. The approximate semantic segmentation result may correspond to detailed parts of a human body. A third branch 1670 is a direction prediction branch. In the third branch 1670, a relative direction of each pixel within each of the image frames with respect to a central portion of the human body is predicted, and accordingly a direction prediction result is generated.

In a block 1680, the approximate semantic segmentation result of the second branch 1660 and the direction prediction result of the third branch 1670 are combined to generate a human body part parsing result. To combine the approximate semantic segmentation result and the direction prediction result, a convolution operation of 1×1 may be performed.

Figure 17:
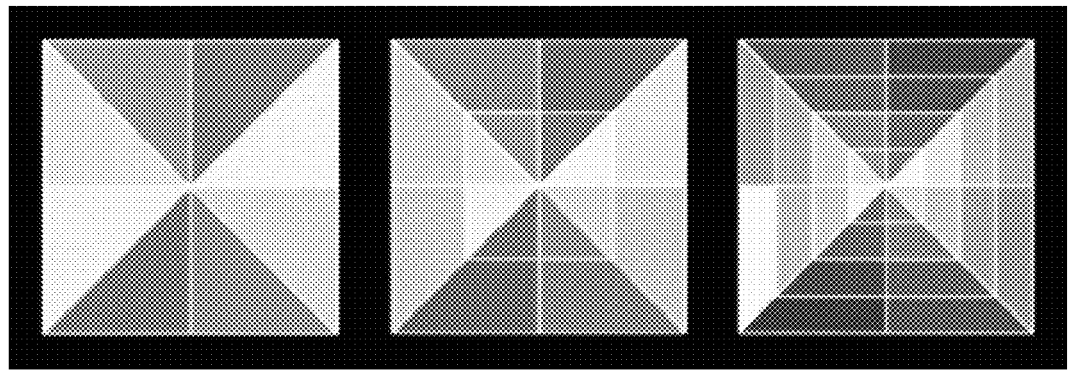
FIG. 17 illustrates an example of a direction feature quantization of the action prediction process of FIG. 15, in accordance with one or more embodiments.

The above description may correspond to a test operation. In a training operation, the second branch 1660 may use a cross-entropy as a loss function, may perform an approximate partial semantic segmentation on a human body image area candidate extracted in the first branch 1650, and may output an approximate semantic segmentation result. The third branch 1670 may also use a cross-entropy as a loss function, and may predict a relative direction of each pixel within each of the image frames with respect to the central portion of the human body. Thus, as shown in FIG. 17, a relative direction and a distance of a human body instance to which pixels belong may be quantified. The approximate semantic segmentation result and the direction prediction result may be combined, a cross-entropy function for the human body part parsing result may be calculated, and thus all network parameters may be trained.

Figure 18:
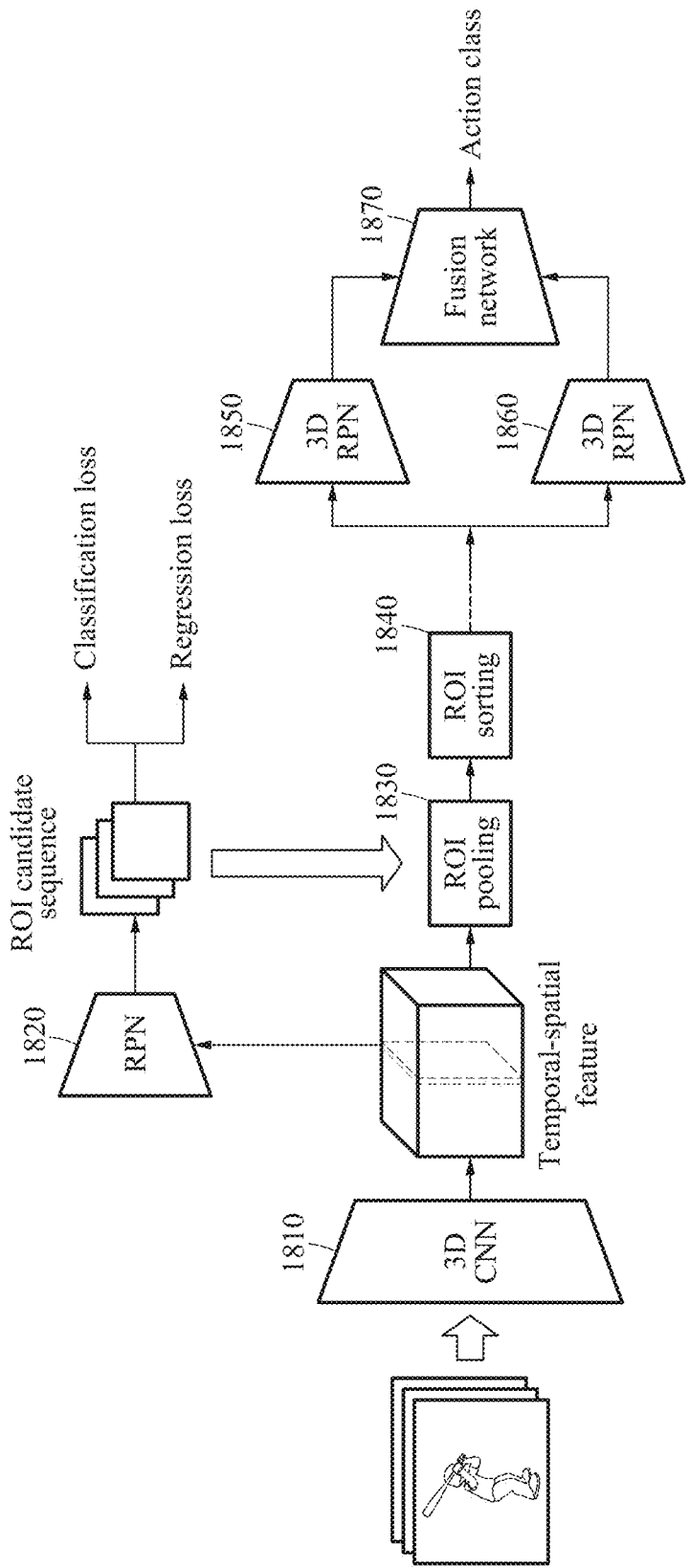
FIG. 18 illustrates another example of an action prediction method, in accordance with one or more embodiments.

FIG. 18 illustrates another example of an action prediction method. To reduce a computing operation load, an action prediction may be performed through a multi-task including a human body localization task and a human body action classification task.

Referring to FIG. 18, a feature is extracted from an image sequence of a temporal-spatial domain through a 3D CNN 1810. Also, through an RPN 1820, a ROI candidate sequence is determined, and a video-based local feature image is generated through a ROI pooling 1830 using the ROI candidate sequence, and through a ROI sorting 1840. The description provided with reference to FIG. 14 may apply to the 3D CNN 1810, the RPN 1820, the ROI pooling 1830 and the ROI sorting 1840. Also, a 2D CNN-based action prediction method may be performed by replacing the 3D CNN 1810 with a 2D CNN.

A direction of the RPN 1820 corresponds to a human body localization branch. Through the human body localization branch, a spatial position of a human body in a video may be estimated and a box corresponding to a human body area may be specified. Directions of 3D CNNs 1850 and 1860 correspond to an action classification branch. Through the action classification branch, a human body action in a box may be predicted.

Human body actions may be classified into human body pose actions and interactive actions based on types of human body actions. For example, the human body pose action may include sitting, standing or running. Subtypes of human pose actions may be mutually exclusive. In other words, only one of a plurality of human body pose actions may be established and the plurality of human body pose actions may not be simultaneously established. For example, a user may be unable to stand while sitting. For the human pose actions, a loss function, for example, a softmax function, to classify pose actions with a plurality of mutually exclusive labels may be used. Subtypes of interactive actions may not be mutually exclusive. For example, a user may read a book while smoking. For the interactive actions, a loss function, for example, a plurality of logistic regression functions, to classify interactive actions with a plurality of mutually non-exclusive labels may be used.

The action classification branch includes the 3D CNNs 1850 and 1860 and a fusion network 1870. The video-based local feature image generated through the ROI sorting 1840 is input to each of the 3D CNNs 1850 and 1860. Each of the 3D CNNs 1850 and 1860 may be individually trained on a predetermined operation feature and may extract features associated with a human body pose action and an interactive action from the video-based local feature image. The 3D CNN 1850 has a human body pose action as a classification label and extracts a feature associated with the human body pose action from the video-based local feature image. The 3D CNN 1860 has an interactive action as a classification label and extracts a feature associated with the interactive action from the video-based local feature image. The fusion network 1870 additionally classifies a human body action by fusing outputs of the 3D CNNs 1850 and 1860. Thus, an action classification result may be generated and a human body action may be predicted based on the action classification result.

The above description may correspond to a test operation. In a training operation, the following operations may be performed.

(1) Using a plurality of image frames of a video as inputs, the 3D CNN 1810 and the RPN 1820 corresponding to the human body localization branch are trained. Networks, for example, the 3D CNNs 1850 and 1860 and the fusion network 1870, corresponding to the action classification branch are not trained. Also, the RPN 1820 may optimize two loss functions, for example, a classification loss of a ROI and a regression loss of a ROI.

(2) When a ROI candidate sequence for the plurality of image frames of the video is determined by the RPN 1820, the 3D CNN 1810, and the networks corresponding to the action classification branch are trained. The RPN 1820 corresponding to the human body localization branch is not trained. When a frame-based global feature image is extracted from an input video through the 3D CNN 1810 shared by the human body localization branch and the action classification branch, a frame-based local feature image is output by performing the ROI pooling 1830 using the ROI candidate sequence with respect to the frame-based global feature image. A video-based local feature image is acquired by performing the ROI sorting 1840 on the frame-based local feature image, and a human body action is output through the action classification branch.

The action classification branch may optimize three loss functions. The three loss functions may include, for example, a loss function of the 3D CNN 1850 to classify pose actions with a plurality of labels in mutually exclusive classes, a loss function of the 3D CNN 1860 to classify interactive actions with a plurality of mutually non-exclusive labels, and a loss function of the fusion network 1870 to classify human body actions with a plurality of labels.

(3) When a plurality of image frames of a video are input and when the 3D CNN 1810 is fixed, the RPN 1820 corresponding to the human body localization branch is independently trained.

(4) When a plurality of image frames of a video are input and when the 3D CNN 1810 is fixed, the networks corresponding to the action classification branch are independently trained.

Figure 19:
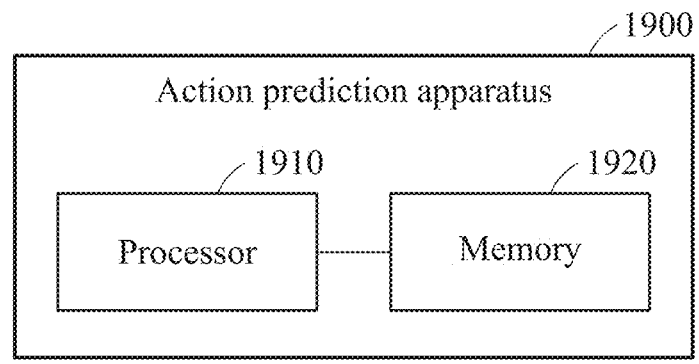
FIG. 19 is a block diagram illustrating an example of an action prediction apparatus, in accordance with one or more embodiments.

FIG. 19 is a block diagram illustrating an example of an action prediction apparatus 1900.

Referring to FIG. 19, the action prediction apparatus 1900 includes a processor 1910 and a memory 1920. Any one or any combination of the server 700 of FIG. 7, the AR apparatus 800 of FIG. 8 and the AR apparatus 1200 may perform an action prediction by implementing the action prediction apparatus 1900. For example, the action prediction apparatus 1900 may be implemented as at least a portion of at least one of the server 700 of FIG. 7, the AR apparatus 800 of FIG. 8 and the AR apparatus 1200 of FIG. 12.

The processor 1910 may be a single processor, or a combination of a plurality of processors. For example, when the action prediction apparatus 1900 includes a plurality of processors 1910, the one or more processors 1910 may be used to perform different operations. The memory 1920 stores instructions executable in a computer. When the instructions are executed by the one or more processors 1910, the one or more processors 1910 may perform any one or any combination of operations associated with the above-described action prediction.

In an example, when an instruction is executed by the one or more processors 1910, the one or more processors 1910 may perform an action prediction by fusing classification results based on a plurality of action classification schemes. In another example, when an instruction is executed by the processor 1910, the one or more processors 1910 may acquire a video-based local feature image from an image frame of a video, may extract a first feature associated with a human body pose action and a second feature associated with an interactive action from the video-based local feature image using a first 3D CNN having a human body pose action as a classification label and a second 3D CNN having an interactive action as a classification label, and may fuse the first feature and the second feature to acquire an action classification result.

The camera 220, AR apparatus 230, server 700, processor 710, memory 720, the AR apparatus 800, processor 810, memory 820, AR terminal 910, AR wearable device 920, AR apparatus 1200, processor 1210, memory 1220, the action prediction apparatus 1900, processor 1910, and memory 1920, described herein with respect to FIGS. 1-19 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-19 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A method of controlling an augmented reality (AR) apparatus, the method comprising:
   acquiring a video;
   detecting a human body from the acquired video;
   performing an action prediction with regard to the detected human body; and
   controlling the AR apparatus based on a result of the action prediction and a mapping relationship between human body actions and AR functions,
   wherein the performing the action prediction further includes:
   generating a human body part parsing result based on a convolution of an approximate semantic segmentation result and a direction prediction result; and
   performing an action classification with regard to the human body actions based on a frame-based local feature image, a human body pose feature, and the human body part parsing result,
   wherein the performing of the action classification comprises:
   determining an image area of a human body instance in an image frame of the acquired video;
   performing an approximate partial semantic segmentation on a human body image area candidate extracted from the image area, and generating an approximate semantic segmentation result corresponding to detailed parts of the human body;
   predicting a relative direction of each pixel in the image frame with respect to a central portion of the human body and generating the direction prediction result;

performing the convolution based on the approximate semantic segmentation result and the direction prediction result and generating the human body part parsing result; and performing the action classification with the first action classification scheme based on the frame-based local feature image, the human body pose feature and the human body part parsing result.

2. The method of claim 1, wherein the acquired video is one or more of a video of the AR apparatus and a user of the AR apparatus captured by a camera distinguished from the AR apparatus, a video captured from a viewpoint of the user of the AR apparatus with a camera connected to the AR apparatus, and a video generated and stored in advance in the AR apparatus.

3. The method of claim 1, wherein in response to the acquired video being a video of the AR apparatus and a user of the AR apparatus captured by a camera distinguished from the AR apparatus, the detecting of the human body comprises:
recognizing the user corresponding to the detected human body;
associating the user with the AR apparatus based on an AR user database (DB); and
establishing a communication with the AR apparatus.

4. The method of claim 1, wherein the performing of the action prediction comprises performing the action prediction by fusing classification results based on a plurality of action classification schemes.

5. The method of claim 1, wherein the performing of the action prediction comprises:
acquiring the frame-based local feature image, a video-based local feature image and a video-based global feature image from an image frame of the acquired video;
acquiring action classification results by performing the action classification with regard to the human body actions based on any two or any combination of a first action classification scheme of using the frame-based local feature image and the human body pose feature, a second action classification scheme of using the video-based local feature image, and a third action classification scheme of using the video-based global feature image and the video-based local feature image; and
fusing the action classification results and performing the action prediction.

6. The method of claim 5, wherein the acquiring of the frame-based local feature image, the video-based local feature image and the video-based global feature image from the image frame of the video comprises:
generating a frame-based global feature image by extracting a feature from an image sequence of a temporal-spatial domain of the image frame using a three-dimensional (3D) convolutional neural network (CNN);
determining a region of interest (ROI) candidate from the frame-based global feature image using a regional recommendation network (RPN);
performing a ROI pooling with the ROI candidate with respect to the image frame and tearing the frame-based local feature image from the frame-based global feature image;
generating the video-based local feature image by performing a ROI sorting on the frame-based local feature image; and
generating the video-based global feature image based on the frame-based global feature image and the video-based local feature image.

7. The method of claim 5, wherein the acquiring of the frame-based local feature image, the video-based local feature image and the video-based global feature image from the image frame of the video comprises performing an action localization on a plurality of frame-based local feature images including the frame-based local feature image and selecting the video-based local feature image from a plurality of video-based local feature images.

8. The method of claim 7, wherein the performing of the action localization comprises performing the action localization with a fully connected (FC) network that comprises a first FC branch that determines which ROI candidate includes the human body and a second FC branch that determines a position of a box including the human body.

9. The method of claim 1, wherein the performing of the action prediction comprises:
acquiring a video-based local feature image from an image frame of the video;
extracting a first feature associated with a human body pose action and a second feature associated with an interactive action from the video-based local feature image with a first 3D CNN having a human body pose action as a classification label and a second 3D CNN having an interactive action as a classification label; and
fusing the first feature and the second feature and acquiring an action classification result.

10. The method of claim 9, wherein
the first 3D CNN is trained in advance with a loss function that classifies pose actions with a plurality of labels in mutually exclusive categories, and
the second 3D CNN is trained in advance with a loss function that classifies interactive actions with a plurality of labels in mutually non-exclusive categories.

11. A non-transitory computer-readable storage medium storing instructions that, when executed by a processor, cause the processor to perform the method of claim 1.

12. A server that controls an augmented reality (AR) apparatus, the server comprising:
a processor; and
a memory comprising instructions executable in the processor,
wherein in response to the instructions being executed in the processor, the processor is configured to:
acquire a video;
detect a human body from the acquired video;
perform an action prediction with regard to the detected human body; and
control the AR apparatus based on a result of the action prediction and a mapping relationship between human body actions and AR functions,
wherein, for the performing the action prediction, the processor is further configured to:
generate a human body part parsing result based on a convolution of an approximate semantic segmentation result and a direction prediction result; and
perform an action classification with regard to the human body actions based on a frame-based local feature image, a human body pose feature, and the human body part parsing result,
wherein the performing of the action classification comprises:
determining an image area of a human body instance in an image frame of the acquired video;

performing an approximate partial semantic segmentation on a human body image area candidate extracted from the image area, and generating an approximate semantic segmentation result corresponding to detailed parts of the human body;

predicting a relative direction of each pixel in the image frame with respect to a central portion of the human body and generating the direction prediction result;

performing the convolution based on the approximate semantic segmentation result and the direction prediction result and generating the human body part parsing result; and performing the action classification with the first action classification scheme based on the frame-based local feature image, the human body pose feature and the human body part parsing result.

13. The server of claim 12, wherein the acquired video is a video of the AR apparatus and a user of the AR apparatus captured by a camera distinguished from the AR apparatus.

14. The server of claim 12, wherein the processor is configured to recognize a user corresponding to the detected human body, to associate the user with the AR apparatus, and to establish a communication with the AR apparatus.

15. The server of claim 12, wherein the processor is configured to perform the action prediction by fusing classification results based on a plurality of action classification schemes.

16. The server of claim 12, wherein the processor is configured to:
acquire a video-based local feature image from an image frame of the acquired video;
extract a first feature associated with a human body pose action and a second feature associated with an interactive action from the video-based local feature image with a first three-dimensional (3D) convolutional neural network (CNN) having a human body pose action as a classification label and a second 3D CNN having an interactive action as a classification label; and
fuse the first feature and the second feature and acquire an action classification result.

17. An augmented reality (AR) apparatus comprising:
a processor; and
a memory comprising instructions executable in the processor,
wherein in response to the instructions being executed in the processor, the processor is configured to:
acquire a video;
detect a human body from the acquired video;
perform an action prediction with regard to the detected human body; and
execute an AR function based on a result of the action prediction and a mapping relationship between human body actions and AR functions,
wherein, for the performing the action prediction, the processor is further configured to:
generate a human body part parsing result based on a convolution of an approximate semantic segmentation result and a direction prediction result; and
perform an action classification with regard to the human body actions based on a frame-based local feature image, a human body pose feature, and the human body part parsing result,
wherein the performing of the action classification comprises:
determining an image area of a human body instance in an image frame of the acquired video;
performing an approximate partial semantic segmentation on a human body image area candidate extracted from the image area, and generating an approximate semantic segmentation result corresponding to detailed parts of the human body;

predicting a relative direction of each pixel in the image frame with respect to a central portion of the human body and generating the direction prediction result;

performing the convolution based on the approximate semantic segmentation result and the direction prediction result and generating the human body part parsing result; and performing the action classification with the first action classification scheme based on the frame-based local feature image, the human body pose feature and the human body part parsing result.

18. The AR apparatus of claim 17, wherein the acquired video is a video captured from a viewpoint of a user of the AR apparatus with a camera connected to the AR apparatus, or a video generated and stored in advance in the AR apparatus.

19. The AR apparatus of claim 17, wherein the processor is configured to perform the action prediction by fusing classification results based on a plurality of action classification schemes.

20. The AR apparatus of claim 17, wherein the processor is configured to:
acquire a video-based local feature image from an image frame of the video;
extract a first feature associated with a human body pose action and a second feature associated with an interactive action from the video-based local feature image with a first three-dimensional (3D) convolutional neural network (CNN) having a human body pose action as a classification label and a second 3D CNN having an interactive action as a classification label; and
fuse the first feature and the second feature and acquire an action classification result.

21. A method comprising:
acquiring a video with an augmented reality (AR) apparatus;
detecting an object in the acquired video;
performing an action prediction with regard to the detected object; and
displaying, on the AR apparatus, an AR function based on a result of the action prediction,
wherein the performing the action prediction further includes:
generating a parsing result based on a convolution of an approximate semantic segmentation result and a direction prediction result; and
performing an action classification with regard to object actions based on a frame-based local feature image, a object pose feature, and the parsing result,
wherein the performing of the action classification comprises:
determining an image area of a human body instance in an image frame of the acquired video;
performing an approximate partial semantic segmentation on a human body image area candidate extracted from the image area, and generating an approximate semantic segmentation result corresponding to detailed parts of the human body;
predicting a relative direction of each pixel in the image frame with respect to a central portion of the human body and generating the direction prediction result;

performing the convolution based on the approximate semantic segmentation result and the direction prediction result and generating the human body part parsing result; and performing the action classification with the first action classification scheme based on the frame-based local feature image, the human body pose feature and the human body part parsing result.

* * * * *